United States Patent
Jimichi et al.

(10) Patent No.: US 10,186,952 B2
(45) Date of Patent: Jan. 22, 2019

(54) POWER CONVERSION DEVICE

(71) Applicants: Mitsubishi Electric Corporation, Chiyoda-ku (JP); TOSHIBA MITSUBISHI-ELECTRIC INDUSTRIAL SYSTEMS CORPORATION, Chuo-Ku (JP)

(72) Inventors: Takushi Jimichi, Chiyoda-ku (JP); Kimiyuki Koyanagi, Chiyoda-ku (JP); Sadao Funahashi, Chuo-Ku (JP); Taichiro Tsuchiya, Chuo-Ku (JP); Yasuhiro Shinomiya, Chuo-Ku (JP)

(73) Assignees: Mitsubishi Electric Corporation, Chiyoda-ku (JP); TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 159 days.

(21) Appl. No.: 15/120,683

(22) PCT Filed: Feb. 26, 2015

(86) PCT No.: PCT/JP2015/055655
§ 371 (c)(1),
(2) Date: Aug. 22, 2016

(87) PCT Pub. No.: WO2015/133365
PCT Pub. Date: Sep. 11, 2015

(65) Prior Publication Data
US 2017/0012521 A1    Jan. 12, 2017

(30) Foreign Application Priority Data

Mar. 5, 2014   (JP) ................. 2014-042394
May 20, 2014   (JP) ................. 2014-103939

(51) Int. Cl.
*H02M 7/483*   (2007.01)
*H02M 1/32*    (2007.01)

(52) U.S. Cl.
CPC ............ *H02M 1/32* (2013.01); *H02M 7/483* (2013.01); *H02M 2001/322* (2013.01); *H02M 2001/325* (2013.01); *H02M 2007/4835* (2013.01)

(58) Field of Classification Search
CPC ............ H02M 7/06; H02M 7/08; H02M 7/12; H02M 7/42; H02M 7/44; H02M 7/48;
(Continued)

(56) References Cited

U.S. PATENT DOCUMENTS

| 5,737,200 A | 4/1998 | Miyashita et al. |
| 8,456,786 B2 * | 6/2013 | Vogeli .................. H02M 1/32 361/18 |

(Continued)

FOREIGN PATENT DOCUMENTS

| EP | 2 369 725 A1 | 9/2011 |
| JP | 9-182275 A | 7/1997 |

(Continued)

OTHER PUBLICATIONS

International Search Report dated Jun. 2, 2015 in PCT/JP2015/055655 filed Feb. 26, 2015.

(Continued)

*Primary Examiner* — Timothy J Dole
*Assistant Examiner* — Ivan Laboy Andino
(74) *Attorney, Agent, or Firm* — Oblon, McClelland, Maier & Neustadt, L.L.P.

(57) ABSTRACT

A power conversion device in which a plurality of converter cells are connected in series with one another. The converter cells each include two or more semiconductor devices, an energy storage element and a bypass element including a (Continued)

constituent element for setting the bypass element to be close-circuited by detecting abnormality of a converter cell, and including a constituent element for controlling, among the semiconductor devices, a semiconductor device connected in parallel with the bypass element to set in a turn-on state, at the same time when the bypass element is set close-circuited or in advance of its close circuit.

17 Claims, 19 Drawing Sheets

(58) Field of Classification Search
CPC ........ H02M 7/483; H02M 7/487; H02M 7/49; H02M 7/537; H02M 7/5387; H02M 7/5388; H02M 2007/4835; H02M 1/32; H02M 2001/322; H02M 2001/325; H02J 3/36; H02H 7/1227; H02H 7/1257; H02H 9/041; H02H 9/043
See application file for complete search history.

(56) References Cited

U.S. PATENT DOCUMENTS

| | | | |
|---|---|---|---|
| 2010/0066174 | A1 | 3/2010 | Dommaschk et al. |
| 2010/0118453 | A1 | 5/2010 | Dorn et al. |
| 2011/0235221 | A1 | 9/2011 | Vogeli et al. |
| 2012/0063181 | A1* | 3/2012 | Chimento ............... H02M 1/32 363/56.03 |
| 2012/0153719 | A1* | 6/2012 | Inaba ..................... B60L 3/003 307/10.1 |
| 2013/0063995 | A1 | 3/2013 | Norrga et al. |
| 2013/0083576 | A1* | 4/2013 | Gan ..................... H02M 1/088 363/123 |
| 2015/0333660 | A1* | 11/2015 | Kim ........................ H02M 1/32 363/123 |
| 2015/0357905 | A1* | 12/2015 | Nami ..................... H02M 1/32 363/53 |
| 2016/0126827 | A1* | 5/2016 | Dong ..................... H02M 1/32 363/50 |

FOREIGN PATENT DOCUMENTS

| | | | |
|---|---|---|---|
| JP | 9-191662 | A | 7/1997 |
| JP | 2000-49581 | A | 2/2000 |
| JP | 2010-512135 | A | 4/2010 |
| JP | 2010-524426 | A | 7/2010 |
| JP | 2013-27260 | A | 2/2013 |
| JP | 2013-169088 | A | 8/2013 |
| WO | 2008/125494 | A1 | 10/2008 |
| WO | WO 2010145688 | A1 * | 12/2010 ............. H02M 1/32 |

OTHER PUBLICATIONS

Makoto Hagiwara, et al., "PWM Control and Experiment of Modular Multilevel Converters", IEEJ Transactions on Industry Applications, vol. 128, No. 7, 2008, pp. 957-965 (with English abstract and Extended Summary).

Joerg Dorn, et al., "Transformation of the Energy System in Germany—Enhancement of System Stability by Integration of Innovative Multilevel HVDC in the AC Grid", Internationaler ETG-Kongress 2013, Nov. 5-6, 2013 (6 pages).

Makoto Hagiwara, et al., "Application of a Modular Multilevel Cascade Converter (MMCC-SDBC) to a STATCOM", IEEJ Transactions on Industry Applications, vol. 131, No. 12, 2011, pp. 1433-1441 (with English Abstract and Partial English Translation).

Yuji Shibano, et al., "A Phase-Shifted PWM STATCOM Using the Modular Multilevel Cascade Converter (MMCC-SSBC)" IEEJ Transactions on Industry Applications, vol. 133, No. 9, 2013, pp. 936-942 (with English Abstract and Partial English Translation).

Partial Supplementary European Search Report dated Oct. 17, 2017 in Patent Application No. 15758979.7.

Extended European Search Report dated Feb. 22, 2018 in European Patent Application No. 15758979.7 citing document AX therein 15 pages.

B. P. Muni, et al, Gating and Protection of IGBT in an Inverter, Proceedings of the International Conference on Industrial Electronics, Control and Instrumentation (IECON), XP010042078, vol. CONF. 17, Oct. 28, 1991, pp. 662-667.

* cited by examiner

POWER CONVERSION DEVICE

TECHNICAL FIELD

The present invention relates to a power conversion device in which a plurality of converter cells is connected in series with one another.

BACKGROUND ART

In an electrical power conversion device for use in high-voltage applications, it is made possible to achieve a multilevel converter to go into practical use. A multilevel converter is disclosed with its circuit configuration in which a plurality of converter cells is connected in series with one another between AC terminals U, V and W, and DC terminals P and N; and, in accordance with turn-on/turn-off control of semiconductor switching elements intrinsically exist in the converter cells, AC voltages are generated at the AC terminals U, V and W, and DC voltages, at the DC terminals P and N (for example, refer to Non-Patent Documents 1, 2). In Non-Patent Document 1, half-bridge converter cells referred to as chopper-cells are used. In addition to half-bridge converter cells, in Non-Patent Document 2, converter cells configured in so-called full-bridges using two legs (converter-legs) are also utilized.

Meanwhile, there exists a power conversion device in which, when abnormality occurs in its converter cell (sub-module), output terminals of the converter cell (sub-module) where the abnormality occurs are bypassed by a bypass element (short-circuit device), and continuous operations are made possible (for example, refer to Patent Documents 1 and 2).

RELATED ART DOCUMENTS

Non Patent Documents

[Non-Patent Document 1] Makoto Hagiwara, and Hirofumi Akagi: "PWM Control and Experiment of Modular Multilevel Converters," IEEJ Transactions on Industry Applications, Vol. 128, No. 7, pp. 957-965, Year 2008 (958p, FIG. 1, FIG. 2)

[Non-Patent Document 2] J. Dorn, etc.: "Transformation of the Energy System in Germany-Enhancement of System Stability by Integration of innovative Multilevel HVDC in the AC Grid," International ETG-Kongress 2013.

[Non-Patent Document 3] Makoto Hagiwara, Ryo Maeda, and Hirofumi Akagi: "Application of a Modular Multilevel Cascade Converter (MMCC-SDBC) to a STATCOM," IEEJ Transactions on Industry Applications, Vol. 131, No. 12, pp. 1433-1441

[Non-Patent Document 4] Yuji Shibano, Joao I. Yutaka Ota, and Hirofumi Akagi: "A Phase-Shifted PWM STATCOM Using the Modular Multilevel Cascade Converter (MMCC-SSBC)" IEEJ Transactions on Industry Applications, Vol. 133, No. 9, pp. 936-942

Patent Documents

[Patent Document 1] International Publication No. WO2008/125494 (FIG. 2)

[Patent Document 2] National Publication of International Patent Application No. 2010-524426 (FIG. 2, etc.)

[Patent Document 3] Japanese Laid-Open Patent Publication No. H09-182275

SUMMARY OF THE INVENTION

Problems to be Solved by the Invention

As described above, in a power conversion device applied to a high-voltage power line in which a plurality of converter cells is connected in series with one another, a bypass element removes a faulty converter cell from the series-connected circuit by close-circuiting output terminals of the faulty converter cell when abnormality occurs in any one of the converter cells so that the bypass element's reliable close-circuit operation secures the continuity of operations as a power conversion device; and thus, it can be said that the bypass element is burdened with an important role from the viewpoint of electric power operations.

Nevertheless, it is feared that this bypass element may be subjected to a severe state of an overcurrent or the like associated with its close-circuit operation; if the bypass element is damaged due to the severe usage, there is a case in which a converter cell where abnormality occurs cannot be reliably bypassed. According to this case, there arises problem in that a reliable close-circuit operation cannot be subsequently performed, and the continuity of operations as a power conversion device cannot be secured.

The present invention has been directed at solving these problems described above, and an object of the invention is to obtain a power conversion device in which, when abnormality of a converter cell occurs, a bypass element to close-circuit across converter cell's output terminals is reliably prevented from causing its damage associated with its close-circuit operation, and the continuity of operations is made possible.

Means for Solving the Problems

A power conversion device (for electrical use) according to the present invention comprises:

a plurality of converter cells connected in series with one another, for converting electrical power, and also a detecting portion for detecting whether or not each of the each of the converter cells is normal, the power conversion device is characterized in that:

the converter cells each include a plurality of semiconductor devices, an electrical energy storage element, output terminals, and a bypass element connected on an end thereof to the output terminals; and, when abnormality of a converter cell is detected, the bypass element is close-circuited, and also a semiconductor device being selected, among the plurality of semiconductor devices, so as to continuously form an electric current path in parallel with the bypass element without including the bypass element, is set in a turn-on state at the same time when the bypass element is set close-circuited or in advance of its close circuit, for a time-period until the close circuit of the bypass element (BP) is to be established.

In addition, a power conversion device (for electrical use) according to the present invention comprises:

a plurality of converter cells connected in series with one another, for converting electric power, and also a detecting portion for detecting whether or not the each of the converter cells is normal, the power conversion device is characterized in that:

the convener cells each include a plurality of semiconductor devices, an electrical energy storage element, output terminals, and a bypass element connected on an end thereof to the output terminals;

a semiconductor device being continuously controlled in a turn-on state is included when abnormality of a converter cell (10) is detected; and an arm short-circuit protection unit for protecting a portion of the semiconductor devices against damage due to a short-circuit current is included only in a gate drive unit for driving a gate of, among the plurality of semiconductor devices other than a semiconductor device being continuously controlled in a turn-on state, the portion of the semiconductor devices.

Effects of the Invention

According to the present invention, an overcurrent which flows through a bypass element can be curbed, so that a power conversion device (for electrical use) high in its reliability can be achieved.

As a result, it becomes possible to adopt a small-size, lightweight and inexpensive bypass element, and a small-size and inexpensive power conversion device can be obtained in which the continuity of operations is made possible even when abnormality occurs in any one of converter cells.

EMBODIMENTS FOR CARRYING OUT THE INVENTION

Embodiment 1.

Embodiment 1 relates to a power conversion device (for electrical use) in which a plurality of converter cells is connected in series with one another; the converter cells each have a bypass element for bypassing a converter cell when it becomes faulty, and are characterized in that a semiconductor device connected in parallel with the bypass element is turned on at the same time thereof, or in advance thereof.

Figure 1:
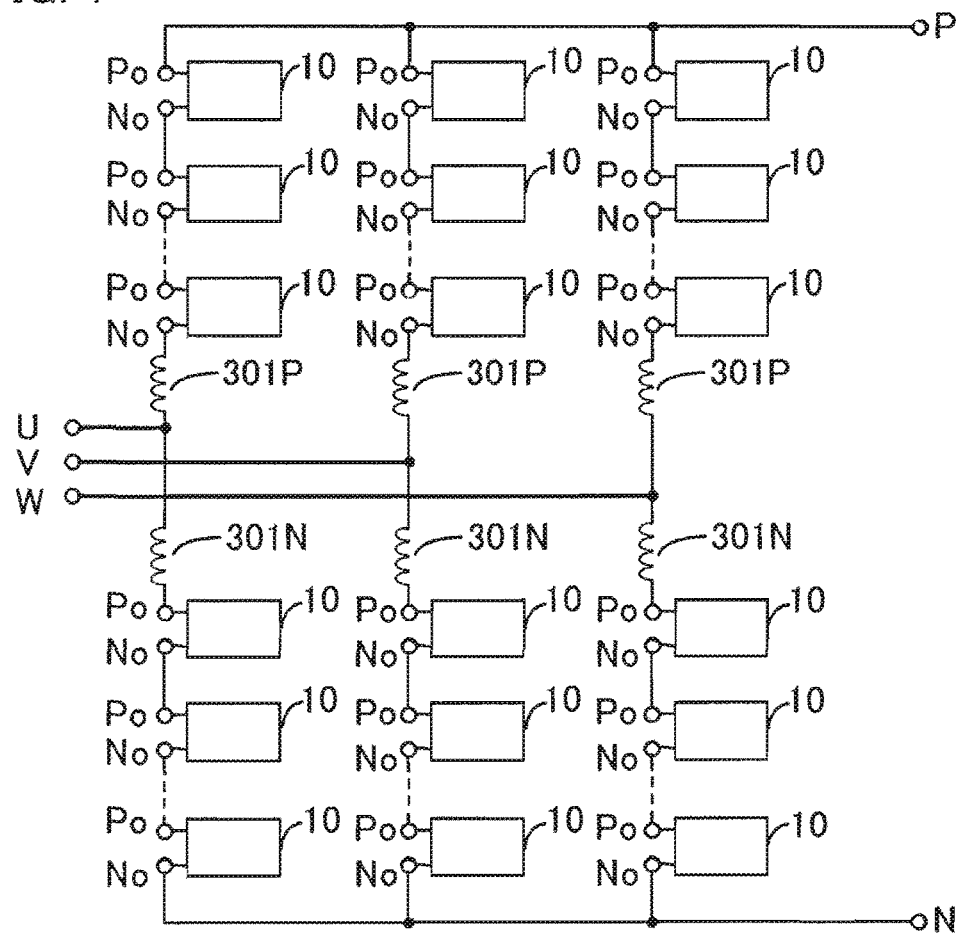
FIG. 1 is a circuit diagram illustrating an example of a main circuit configuration according to the present invention.

FIG. 1 illustrates an example of a main circuit configuration relating to the power conversion device according to Embodiment 1 of the present invention. FIG. 1 is strictly an example, and so a circuit configuration in which converter cells are connected in series is only necessary to be in the scope according to the present invention. Note that, as a circuit configuration in which converter cells are connected in series, the converter is generally referred to as a cascade converter, or also as an MMC (Modular Multilevel Converter: modular multilevel conversion device), or a chain connection converter. It is essential that the converter includes those cells connected in series in it. Note that, a converter cell is defined to include two or more semiconductor devices, and one energy storage element or more.

In FIG. 1, a plurality of converter cells 10 is connected in series between the AC terminals 13, V and W, and the DC terminals P and N, and respective reactors 301P and 301N are included therebetween.

Figure 2:
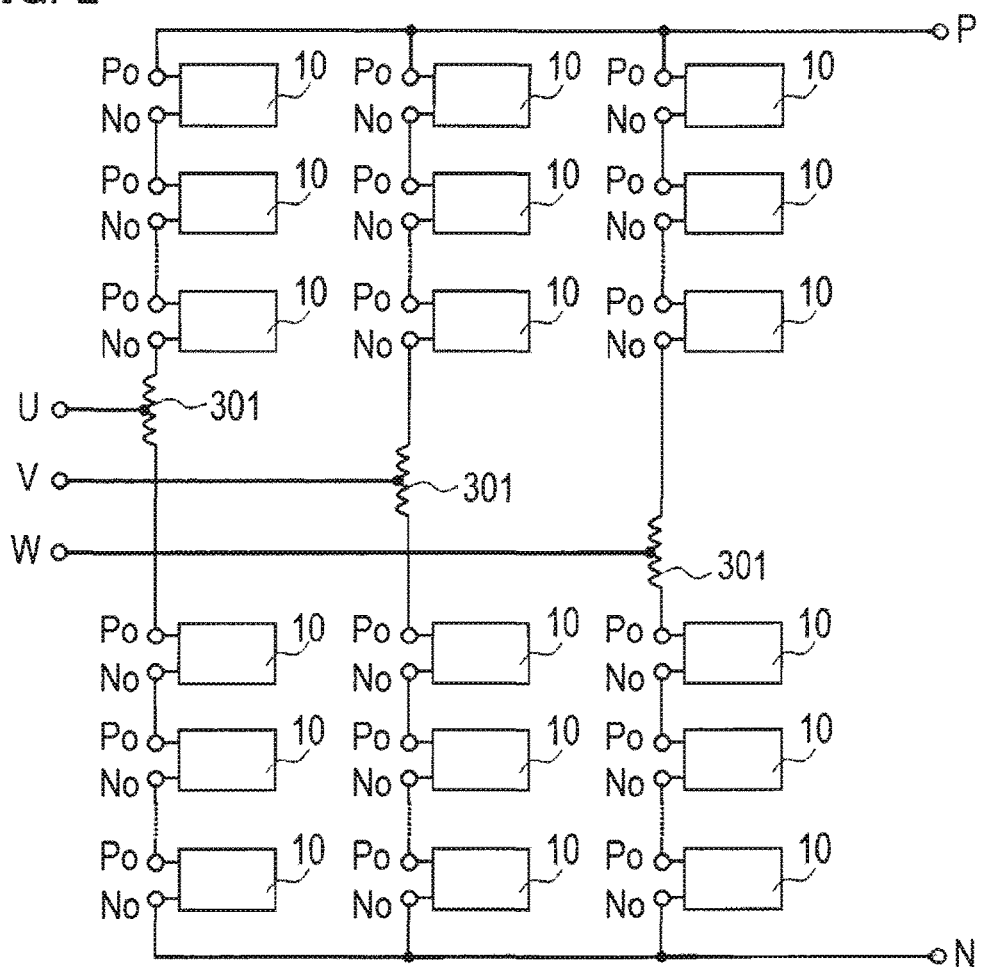
FIG. 2 is a circuit diagram illustrating another example of a main circuit configuration according to the present invention.

As another configuration differing from FIG. 1, the present invention can also be applied to a power conversion device illustrated in FIG. 2. In the power conversion device of FIG. 2, reactors 301 are provided by magnetically coupling between the reactors 301P and 301N of FIG. 1 with each other.

Figure 3:
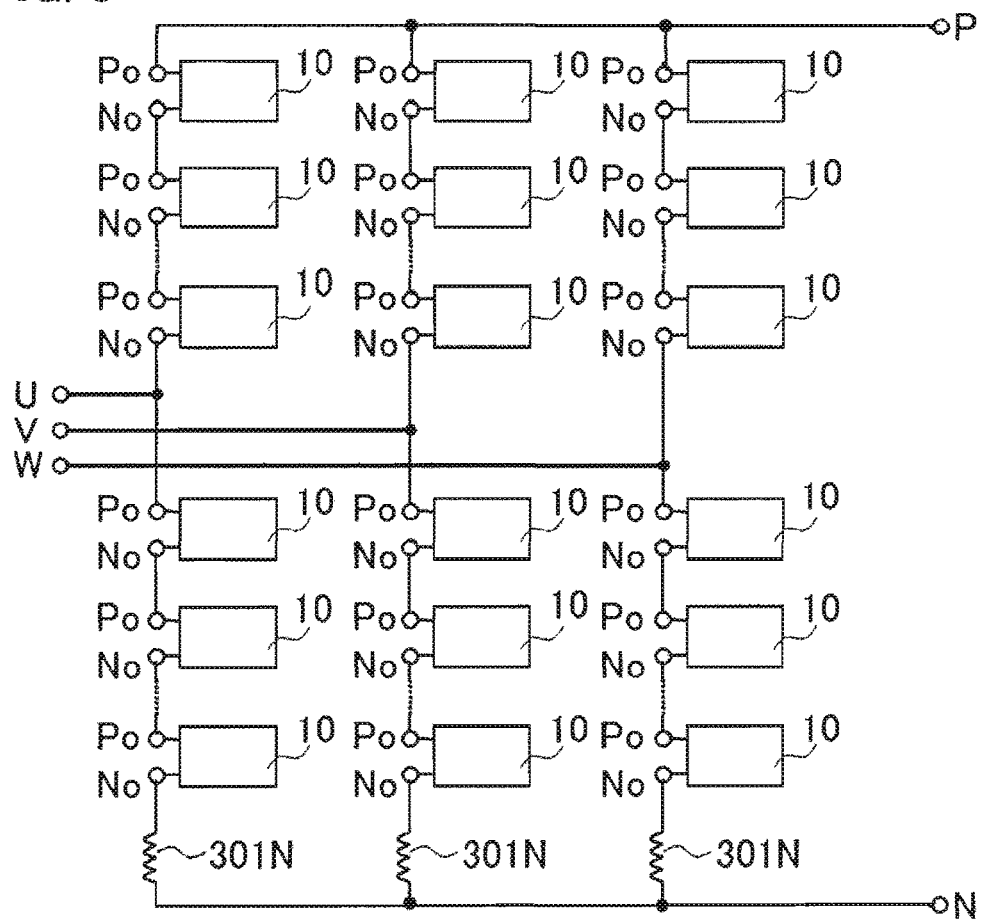
FIG. 3 is a circuit diagram illustrating a further example of a main circuit configuration according to the present invention.

In addition, as a further configuration differing from FIG. 1, the present invention can also be applied to a power conversion device illustrated in FIG. 3. In the power conversion device of FIG. 3, the reactors 301N are only connected therein on a negative electrode side (on the side of DC terminal N) by lumping in with the reactors of FIG. 1.

Figure 4:
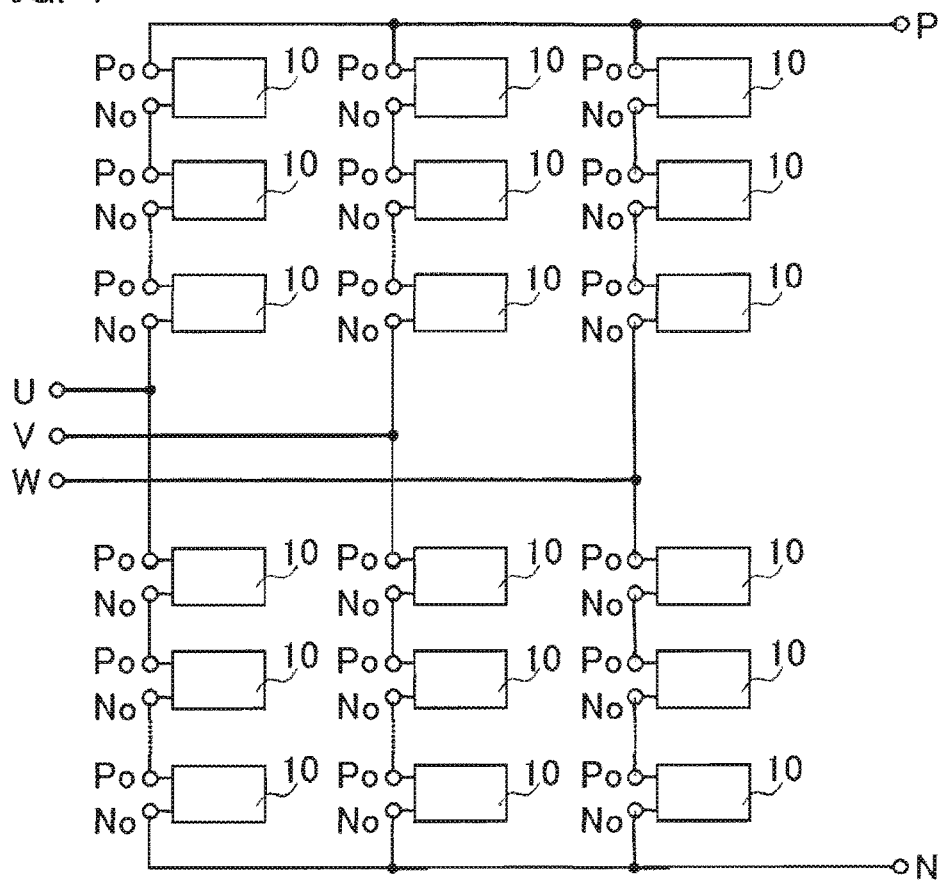
FIG. 4 is a circuit diagram illustrating a still further example of a main circuit configuration according to the present invention.

Moreover, as a still further configuration differing from FIG. 1, the present invention can also be applied to a power conversion device illustrated in FIG. 4. The power conversion device of FIG. 4 does not have a reactor(s), but has parasitic inductances of wiring inductances or the like, having alternative functions of the reactors in FIG. 1.

Figure 5A:
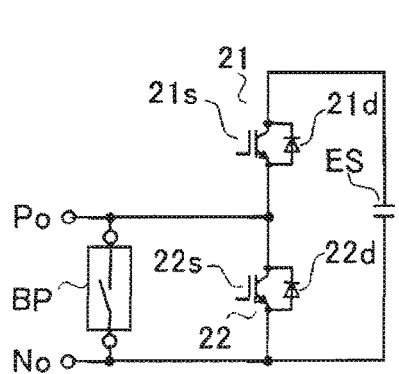
FIGS. 5A and 5B are circuit diagrams each showing an example of converter cells according to the present invention.
Figure 5B:
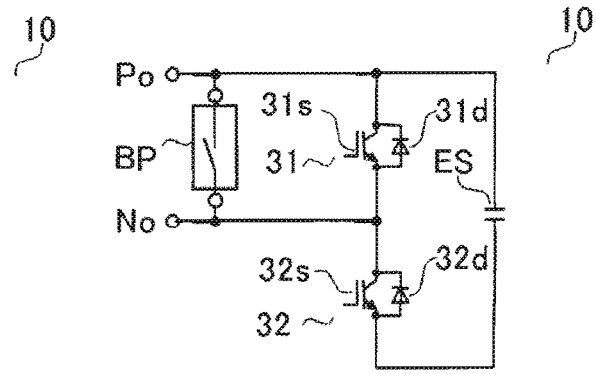

In FIG. 1 through FIG. 4, the converter cells 10 such as those shown in FIG. 5A or FIG. 5B are used. The converter cell 10 has two semiconductor devices 21 and 22, or 31 and 32 or more of them, an energy storage element ES, and a bypass element BP. As for the energy storage element ES, a capacitor is used as an example. As for the bypass element BP, a mechanical switch or a semiconductor switch made of a semiconductor device is used as an example.

The semiconductor devices 21, 22, 31 and 32 are constituted of switching elements 21s, 22s, 31s and 32s, and diode elements 21d, 22d, 31d and 32d connected in antiparallel therewith, respectively. As for the aforementioned switching elements, a switching element of IGBT (Insulated-Gate Bipolar Transistor), and GCT (Gate Commutated Turn-off thyristor), MOSFET (Metal-Oxide-Semiconductor Field-Effect Transistor), etc. is utilized. Note that, the aforementioned semiconductor devices each may be configured so that a plurality of semiconductor devices is connected in parallel in accordance with their current-carrying capacity.

In FIG. 5A, at a connection point of the semiconductor devices 21 and 22, an output terminal Po of the converter cell 10 is provided, and, on a negative electrode side of the semiconductor device 22, an output terminal No of the converter cell 10.

In FIG. 5B, on a positive electrode side of the semiconductor device 31, the output terminal Po of the converter cell 10 is provided, and, at a connection point of the semiconductor devices 31 and 32, the output terminal No of the converter cell 10.

In FIGS. 5A and 5B, by turning the switching elements on and off, either a zero volt or a voltage across both ends of the energy storage element ES can be outputted between the output terminals of converter cell.

In relation to the control of steady-state operations (operations of electrical power conversion in a case in which abnormality does not occur in the converter cells) in FIG. 1 through FIG. 4, the explanation is here omitted because publicly known technologies can be applied. For example, "PWM control methods of modular multilevel converters" set forth in Non-Patent Document 1 can be applied.

As an operation other than the steady-state operations, there is an operation at the time of abnormality. For example, when abnormality (an element malfunction, abnormality of a control power-supply used in a gate drive unit of semiconductor devices, etc., for example) is detected in any one of the converter cells 10, bypassing is performed by close-circuiting the bypass element BP of a converter cell in which its abnormality is detected. In the number of converter cells, if a redundant design (for example, a design to connect one or more additional cells in series) is achieved in which the operations equivalent to steady-state operations (operations of electrical power conversion in a case in which abnormality does not occur in the converter cells) can be obtained, the operations of electrical power conversion can be continuously performed, even when abnormality occurs in any one of the converter cells, by bypassing such a converter cell.

Figure 6A:
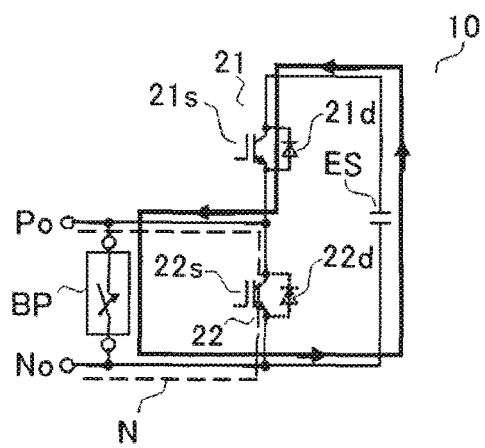
FIGS. 6A and 6B are circuit diagrams each for explaining an example of problems which occur in converter cells.
Figure 6B:
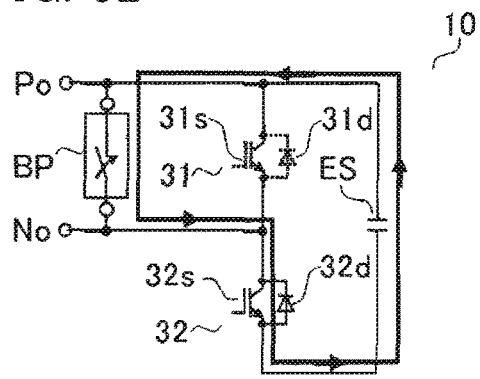

However, there arise problems as shown ire FIGS. 6A and 6B. FIG. 6A indicates, in a short-circuit state of the semiconductor device 21 on the top side to which the bypass element BP is not connected, the short-circuit current of the energy storage element ES which flows when the bypass element BP is close-circuited. In the first place, the bypass element BP is designed at a value of electric current which flows through converter cells in ordinary times of power conversion operations. Usually, this electric current is several kA or less. Meanwhile, the aforementioned short-circuit current reaches to several tens to several hundreds of A. Hence, due to this short-circuit current, it would be probable that the bypass element BP might get damaged; in that case, the power conversion device cannot continuously perform the operations of electrical power conversion. In other words, the reliability is lowered.

As for cases in which such a short-circuit current flows, two cases are conceivable in which the present invention includes the operations to avoid those happening.

The explanation will be made referring to FIG. 6A as an example; a first case is firstly a case in which, when the semiconductor device 21 on the top side to which the bypass element BP is not connected in parallel is in a short-circuit fault (which means a state that it becomes faulty and is in a short-circuit state), abnormality (abnormality of a control power-supply used in a gate drive unit, or the like) related to the short-circuit fault of the semiconductor device 21 is detected, and the bypass element BP is set to be close-circuited. As an object in order to avoid this in the present invention, the semiconductor device 22 connected in parallel with the bypass element BP is turned on at the same time when the bypass element BP is set close-circuited, or in advance of its close circuit. As a result, in parallel with the bypass element BP, there formed is another current path (path of a broken line named as symbol "N" in FIG. 6A, reaching from Po to No, while passing through the semiconductor device 22) in which the bypass element BP is not included. Usually, even when a signal is given to the bypass element BP to implement its "close circuit," several ms or more are generally required in a case of a mechanical switch, whereas a semiconductor device can be turned on by several μs. Note that, when the bypass element BP other than the aforementioned mechanical switch is used, a bypass element may be used which close-circuits by a value of several tens of μs or more after a close-circuit instruction is given.

As a specific example of the abnormality described above, there is abnormality of a control power-supply (not shown in the figures). The control power-supply means an electric power source supplied into a gate drive unit for performing turn-on/turn-off operations on semiconductor devices, and an electric power source supplied into a control board which determines turn-on/turn-off logic. As a detection method of this abnormality, there is a method in which a voltage of a control power-supply is detected, and determination is performed by a comparator (comparison unit) whether or not the voltage is within that of a normal operation range. According to this method, the abnormality can be detected.

In order to set the bypass element BP close-circuited, it is required to supply a control voltage to a control terminal (not shown in the figures) or control coil (not shown in the figures) of the bypass element BP.

That is to say, the energy storage element ES is short-circuited by the semiconductor device 22 connected in parallel with the bypass element BP, before the energy storage element is to be short-circuited by the bypass element BP. Due to the short circuit, the energy accumulated in the energy storage element ES is to be consumed, so that, at a time-point of an actual activation to close-circuit the bypass element BP, the energy becomes in an insufficient state. In this manner, without causing damage to the bypass element BP through which an overcurrent flows, the bypass element is set close-circuited.

Note that, in FIG. 6B, by turning on the semiconductor device 31 connected in parallel with the bypass element BP at the same time when the bypass element BP is set close-circuited or in advance of its close circuit, the bypass element BP is set close-circuited without causing damage thereto.

Figure 7:
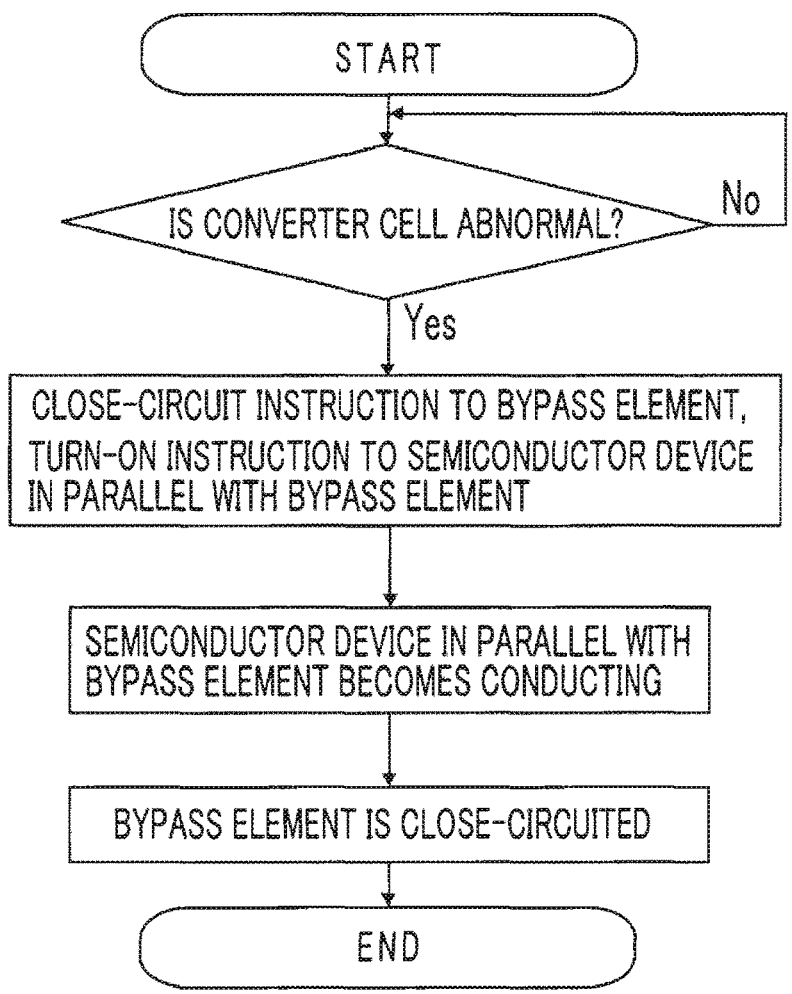
FIG. 7 is a block chart for explaining operations at the time of first abnormality of a converter cell according to the present invention.

In the present invention, when the bypass element BP is set to be close-circuited, the bypass element BP is protected against its damage by turning on the semiconductor device connected in parallel with the bypass element BP at the same time when the bypass element BP is set close-circuited or in advance of its close circuit, and a converter cell in which its abnormality occurs can be suitably bypassed. Note that, in FIG. 7, the logic therefor is described. FIG. 7, first, determination is distinguishably made whether or not a converter cell is abnormal. If abnormality is caused, is required bypass the converter cell, so that a "close-circuit" instruction is given to a bypass element, and also a "close" instruction (turn-on instruction) is given to a semiconductor device being in parallel with the bypass element. According to the manner of processing described above, the semiconductor device being in parallel with the bypass element becomes conducting, and, at the same time of the conduction or a subsequent time thereof the bypass element is set close-circuited.

Next, he explanation will be made for a second case referring to FIG. 6A as an example. The second case is a case in which, when the semiconductor device 21 with which the bypass element BP is not connected in parallel on the top side is controlled in a turn-on state, the bypass element BP is close-circuited due to its misoperation by noise or the like. When the bypass element BP is close-circuited due to its misoperation, the energy storage element ES is short-circuited through the semiconductor device 21 and the bypass element BP. When the semiconductor device 21 is not faulty, a short-circuit current is limited to a value referred to as a saturation current (usually, in the degree of several kA). However, the semiconductor device 21 reaches to be faulty generally by several tens μs, and becomes completely in a short-circuit state, so that an electric current of the bypass element BP instantaneously increases to several tens of to several hundreds of kA. In order to prevent this happening, an arm short-circuit protection unit is included in a gate drive unit for driving the semiconductor device 21. Note that, the arm short-circuit protection unit means a portion to protect a semiconductor device against a short-circuit current which flows through the semiconductor device when the energy storage element ES is thereby short-circuited. The arm short-circuit protection unit interrupts the semiconductor device 21 by directly or indirectly detecting that a short-circuit current flows through semiconductor device. By achieving this within several tens of μs before the semiconductor device are reaching to be faulty, the short-circuit current is removed. Because high-voltage semiconductor devices used ire such a circuit as that in FIG. 1 has generally overload-tolerance capability (usefulness characteristic not to be broken down) against a short-circuit current if its duration is within 10 μs, the protection can be reliably performed by carrying out an interruption within 10 after the short circuit occurs. According to this operation, the semiconductor device 21 does not become faulty, so that it is possible to prevent an electric current, from several tens of kA to several hundreds of kA, from flowing through the bypass element BP. Consequently, the fault of the bypass element BP can be prevented.

Here, when a semiconductor device is interrupted by the arm short-circuit protection unit, an operation named as "soft turn-off" may be implemented to perform the interruption by means of a switching operation which is delayed in time more than a switching operation under usual control. This is because a saturation current of a semiconductor device is larger than an electric current thereof under usual control, surge voltages produced across both ends of the semiconductor device are to be curbed at the time of its interruption.

Note that, in FIG. 6B, an arm short-circuit protection unit is included in a gate drive unit which drives the semiconductor device 32 with which the bypass element BP is not connected in parallel.

Figure 8:
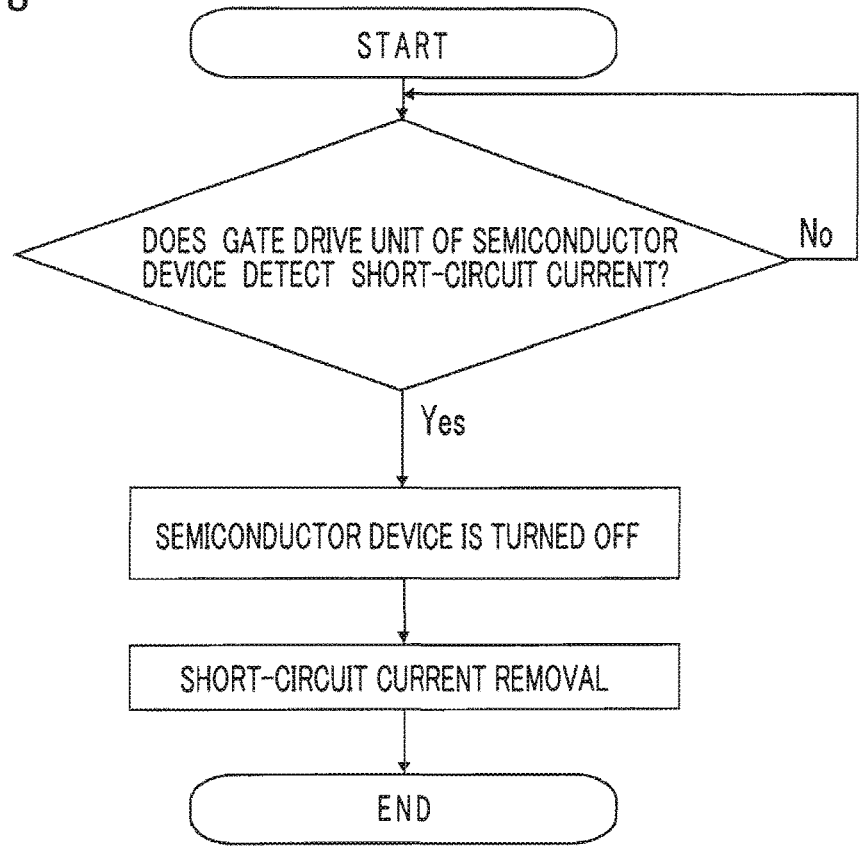
FIG. 8 is a block chart for explaining operations at the time of second abnormality of a converter cell according to the present invention.

In the present invention, by including the arm short-circuit protection unit in the gate drive unit that drives the semiconductor device with which the bypass element BP is not connected in parallel, the bypass element EP is protected against its damage, and a converter cell in which its abnormality occurs can be suitably bypassed. Note that, in FIG. 8, the logic therefor is described. In FIG. 8, first, because a short-circuit current is produced when the bypass element is close-circuited due to its misoperation, in order to detect the short-circuit current, determination is made whether or not a gate drive unit of a semiconductor device with which the bypass element is not connected in parallel detects a short-circuit current. Next when a short-circuit current is detected, the semiconductor device with which the bypass element is not connected in parallel is interrupted (turned off). As a result, the short-circuit current is removed. The operations in the flow shown in the figure from the start until the removal of the short-circuit current are also the operations of the arm short-circuit protection unit.

Figure 9A:
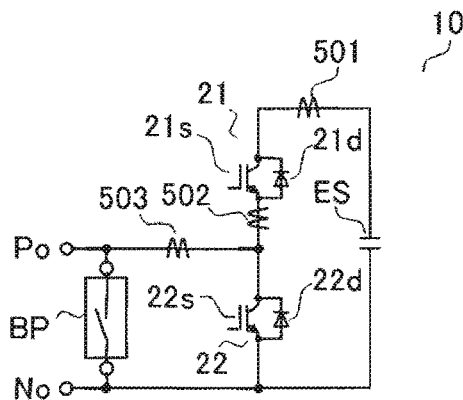
FIGS. 9A and 9B are circuit diagrams each showing example of current sensors to detect a short-circuit current.
Figure 9B:
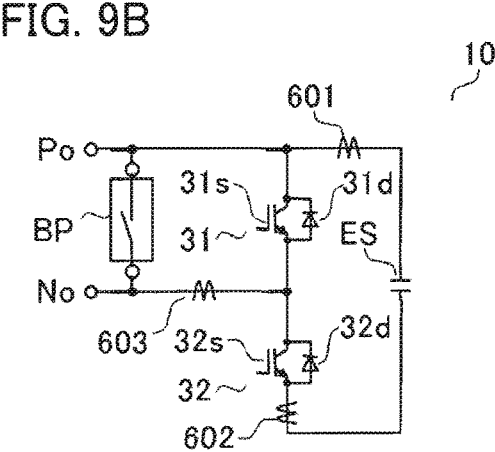

In FIGS. 9A and 9B, current sensors are shown in the figures each as one of the methods to detect a short-circuit current. The current sensors may be adopted such as a current sensor 501 that one of them is connected between each end of an energy storage element and that of the semiconductor device, and may be adopted such as a current sensor 502 that it is provided immediately near to the semiconductor device 21, or, in a case of a module-type device, is built in the semiconductor device 21. In addition, one of the current sensors may be adopted such as a current sensor 503 that it is connected between the connecting portions of the semiconductor devices and the bypass element. Note that in FIG. 9E, an electric current corresponding to a current sensor 601 is detected as the current sensor 501; a current corresponding to a current sensor 602, detected as the current sensor 502; and a current corresponding to a current sensor 603, detected as the current sensor 503. The current detection functionality is equivalent to that of FIG. 9A.

Figure 10:
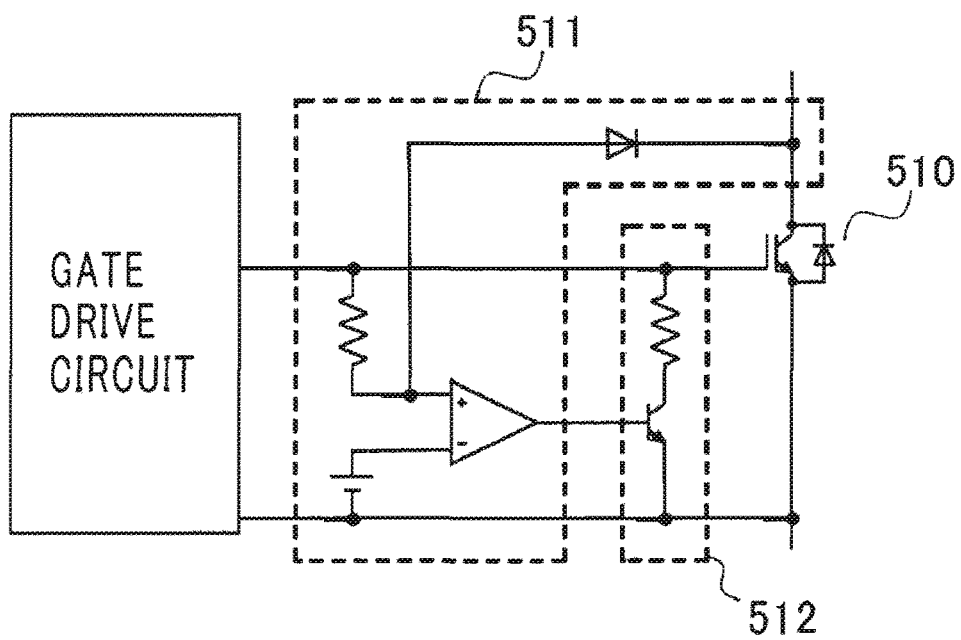
FIG. 10 is a circuit diagram showing an example of a detecting portion to detect a short-circuit current, and an interrupting portion to interrupt the short-circuit current.

Moreover, there is a publicly known example in regard to a specific method in which a short-circuit current is detected which flows through a semiconductor device, so that the semiconductor is interrupted. For example, an "Overcurrent Protection Circuit of a Power Semiconductor Transistor" of Patent Document 3 can be applied to. FIG. 10 sets forth a circuit diagram in which the main points are extracted from Patent Document 3. FIG. 10 shows, with respect to the semiconductor device 510 under consideration, a detecting portion 511 to detect a short-circuit current, and an interrupting portion 512 which performs an interrupting operation when the short-circuit current is detected.

The detecting portion 511 to detect a short-circuit current detects whether a collector potential is a predetermined voltage or more when a turn-on signal is entered into the semiconductor device 510. When the semiconductor device is short-circuited, it is in a state in which a voltage of the energy storage element ES is applied across both ends of the semiconductor device, so that a voltage thereof in the turn-on state rises. On the other hand, in a case of not being in a short-circuit state, a voltage drop of the semiconductor device is several V. The detecting portion 511 determines, by detecting the collector potential and comparing it using a comparator, whether or not a short-circuit current is in a state of flowing through.

Meanwhile, the interrupting portion 512 performs the interruption by receiving a signal from the detecting portion 511. At the time of the interruption as exactly described above, an operation named as "soft turn-off" is achieved by performing the interruption through a larger resistance than that at the time of interruption in steady-state operations.

Embodiment 2.

In Embodiment 1, the explanation is made for the power conversion device using half-bridge converter cells. In Embodiment 2, the explanation will be made for a case in which full-bridge converter cells are used, each of which comprises two legs made of two pairs of upper and lower arms.

Figure 11A:
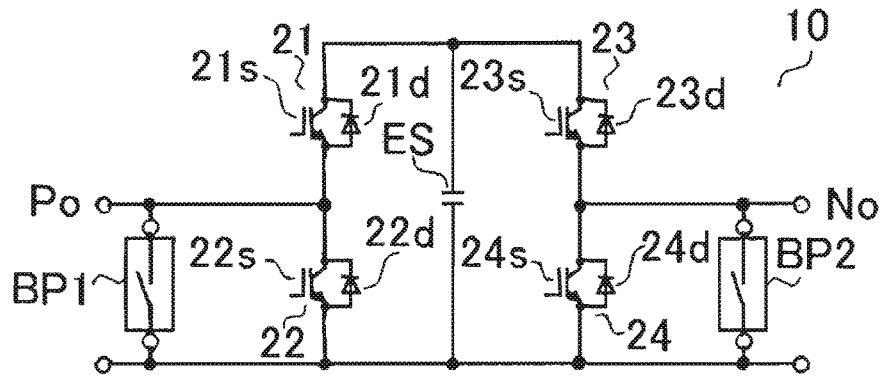
FIGS. 11A, 11B and 11C are circuit diagrams each showing an example of other converter cells according to the present invention.
Figure 11B:
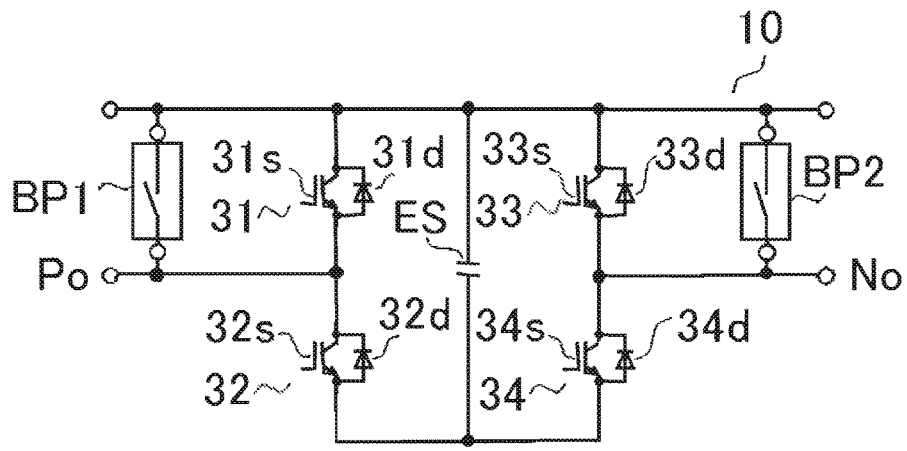
Figure 11C:
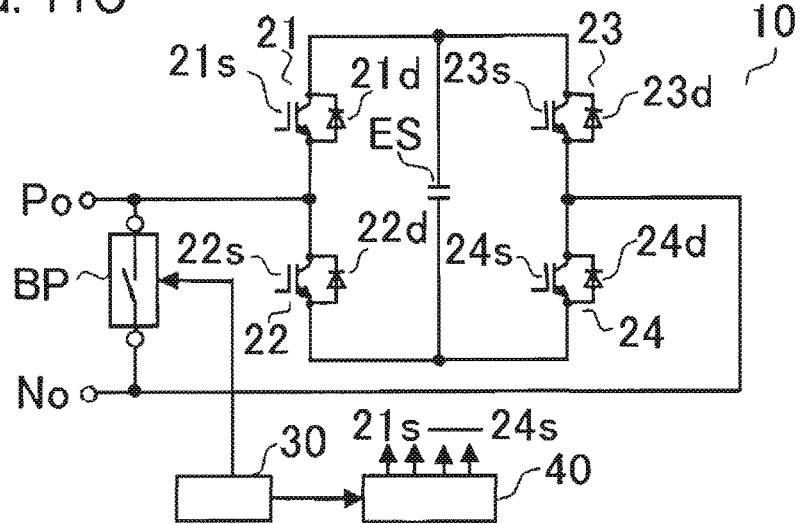

In FIGS. 11A, 11B and 11C, an example of converter cells each in Embodiment 2 is illustrated. The explanation will be made referring to FIG. 11A as an example, where the converter cell 10 takes a full-bridge configuration using four or more semiconductor devices. A series-connected pair of the semiconductor devices 21 and 22 is connected in parallel with the energy storage element ES, and the output terminal Po of the converter cell is included at the connection point between the semiconductor devices 21 and 22. In parallel with the semiconductor device 22, a first bypass element BP1 is provided. Meanwhile, a series-connected pair of semiconductor devices 23 and 24 is connected in parallel with the energy storage element ES, and the output terminal No of the converter cell is included at the connection point between the semiconductor devices 23 and 24. In parallel with the semiconductor device 24, a second bypass element BP2 is provided.

Meanwhile, in FIG. 11B, a series-connected pair of the semiconductor devices 31 and 32 is connected in parallel with the energy storage element ES, and the output terminal Po of the converter cell is included at the connection point between the semiconductor devices 31 and 32. In parallel with the semiconductor device 31, the first bypass element BP1 is provided. Meanwhile, a series-connected pair of semiconductor devices 33 and 34 is connected in parallel with the energy storage element ES, and the output terminal No of the converter cell is included at the connection point between the semiconductor devices 33 and 34. In parallel with the semiconductor device 33, the second bypass element BP2 is provided.

In addition, FIG. 11C is a figure of the converter cell to which constituent elements are further added that are a fault detection unit 30 for detecting abnormality of a bypass element, and a gate drive unit 40 for driving semiconductor devices. In this figure, each of the two pairs of upper and lower arms is configured by the respective semiconductor devices 21, 22, 23 and 24 to which the energy storage element ES and the bypass element BP are connected as shown in the figure.

As for the energy storage element ES, a capacitor is used as an example. As for the bypass element BP, a mechanical switch of vacuum switch or the like, and a semiconductor switch made of a semiconductor device is used as an example.

The semiconductor devices 21, 22, 23 and 24 are constituted of switching elements 21$s$, 22$s$, 23$s$ and 24$s$, and diode elements 21$d$, 22$d$, 23$d$ and 24$d$ connected in antiparallel therewith, respectively. As for the switching elements, a switching element of IGBT (Insulated-Gate Bipolar Transistor), and GCT (Gate Commutated Turn-off thyristor), MOSFET (Metal-Oxide-Semiconductor Field-Effect Transistor) etc. is utilized. Note that, each of these arms may be configured so that a plurality of semiconductor devices is connected in parallel in accordance with their current-carrying capacity, and also each of which may be configured so that a plurality of semiconductor devices is connected in series in accordance with their voltage withstand capability.

In FIG. 11C, at the connection point between the semiconductor devices 21 and 22, the output terminal Po of the converter cell 10 is provided, and, at the connection point between the semiconductor devices 23 and 24, the output terminal No of the converter cell 10.

Each of the switching elements 21$s$ through 24$s$ is controlled by turn-on/turn-off operations based on gate driving signals from the gate drive unit 40. And then, by performing the turn-on/turn-off control on the switching elements 21$s$ through 24$s$ and performing the electrical power conversion between a pair of the output terminals Po and No, and the energy storage element ES, any one of a positive voltage across both ends of the energy storage element ES, or a negative voltage across both ends of the energy storage element ES, or a zero volt can be outputted between the output terminals of the converter cell 10.

In Non-Patent Document 1, a converter cell is used in which only one leg is provided for the converter cell configured by a so-called half-bridge. A half-bridge converter cell can only deliver two levels of output voltages, either a positive voltage across both ends of the energy storage element ES, or a zero volt.

Meanwhile, in Non-Patent Document 2, the configuration is taken by a full-bridge including two legs, so that it is also possible to output a negative voltage across both ends of the energy storage element ES, thereby enhancing a degree of freedom for control.

Because, in regard to steady-state operations of this kind of power conversion device having the main circuit configuration illustrated in FIG. 1, they are publicly known by the document examples or the like cited before, the explanation is omitted, and thus the explanation will be made below for operations at the time of abnormality to which the present invention pays attention, namely, for the operations when abnormality occurs in any one of the converter cells 10.

Note that, the explanation will be made here for the converter cell 10 configured under consideration by a full-bridge shown above in FIG. 11C; however, in regard to a configuration of protective portions at the time of converter cell's abnormality which constitutes the main part of the present invention, the case of a converter cell configured by a half-bridge is also similarly applicable.

As an operation other than the steady-state operations, there is an operation at the time of abnormality. For this reason, the fault detection unit 30 is included as shown in FIG. 11C, and, when abnormality (for example, a malfunction of a semiconductor device(s), abnormality of a control power-supply used in the gate drive unit 40 that send out gate driving signals to switching elements, etc.) is detected in any one of the converter cells 10, the bypass element BP of the converter cell 10 in which its abnormality is detected is close-circuited, so that the converter cell 10 is bypassed.

If a redundant design (for example, a design to connect one or more additional cells in series) is achieved in which the number of series-connected converter cells 10 has redundancy so that the operations equivalent to the steady-state operations (operations of electrical power conversion in a case in which abnormality does not occur in the converter cells 10) are made possible, the operations of electrical power conversion can be continuously performed, even when abnormality occurs in any one of the converter cells 10, by bypassing such a converter cell 10.

Contrarily, even when such a redundant design is administered, it is feared that this bypass element BP may be subjected to a severe condition associated with its close-circuit operation; if the bypass element is damaged due to the severe usage, reliable open-circuit and close-circuit operations cannot be subsequently performed, so that the continuity of operations as a power conversion device cannot be secured.

These converter cells can selectively output three output voltages, which are a positive voltage across the energy storage element, a negative voltage across the energy storage element, and a zero volt, so that a degree of freedom for control is enhanced in comparison with half-bridge converter cells.

Figure 12:
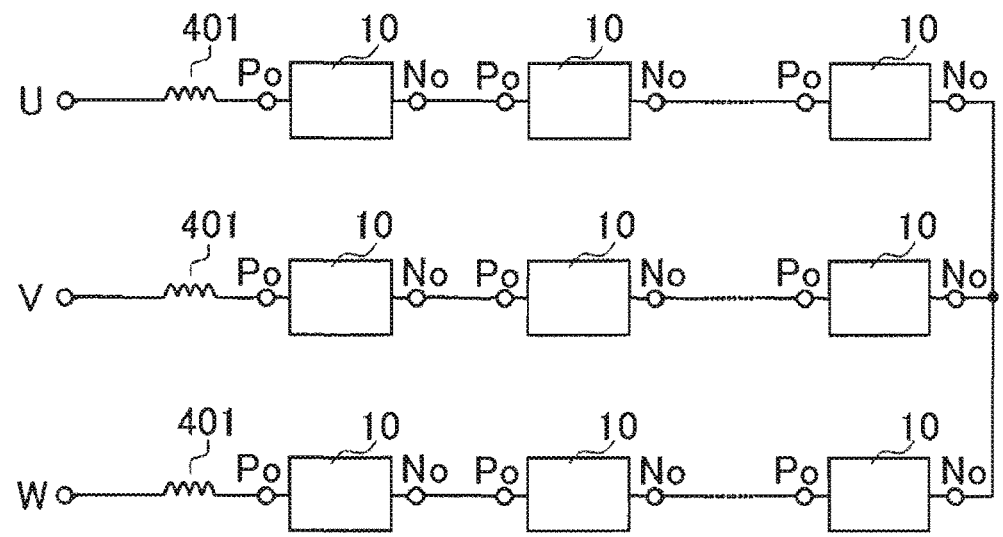
FIG. 12 is a circuit diagram illustrating a yet further example of a main circuit configuration according to the present invention.
Figure 13:
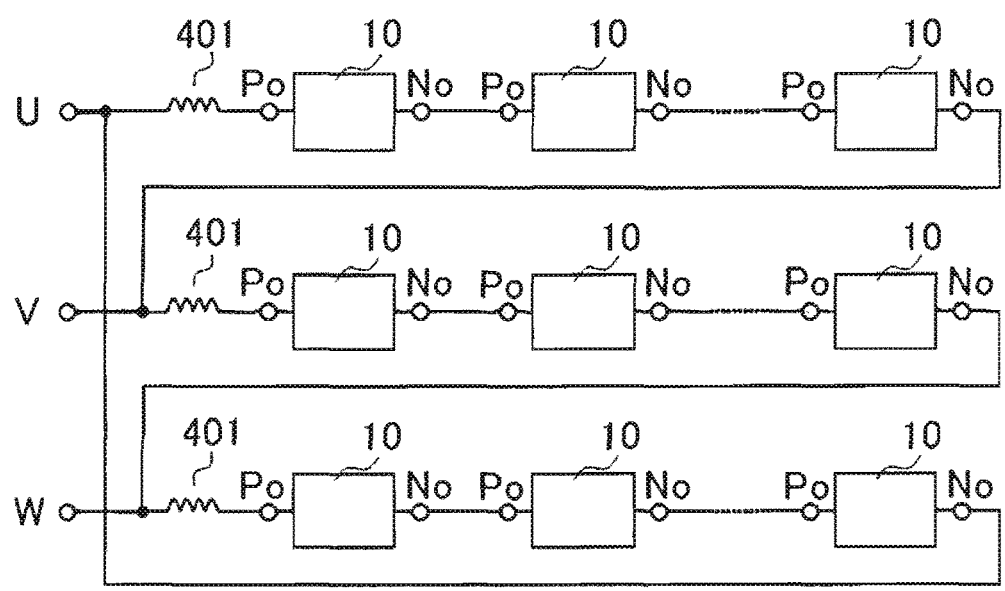
FIG. 13 is a circuit diagram illustrating a yet still further example of a main circuit configuration according to the present invention.

Hence, in addition to the power conversion devices of FIG. 1 through FIG. 4, such power conversion devices of FIG. 12 and FIG. 13 can also be applied. FIG. 12 illustrates a power conversion device in which a plurality of the converter cells 10 is connected in series, and those converter cells are connected in the form of star connection; the power conversion device is referred to as a star-connection cascade converter, or the like.

Meanwhile, FIG. 13 illustrates a power conversion device in which a plurality of the converter cells 10 is connected in series, and those converter cells are connected in the form of delta connection; the power conversion device is referred to as a delta-connection cascade converter, or the like. In FIG. 12 and FIG. 13, numerals "401" designate reactors. In relation to the control for the steady-state operations (operations of electrical power conversion in a case in which abnormality does not occur in the converter cells) in FIG. 12 and FIG. 13, publicly known technologies can be utilized. For example, it is possible to utilize Non-Patent Document 3 and Non-Patent Document 4, and so the detailed explanation is here omitted.

Figure 14A:
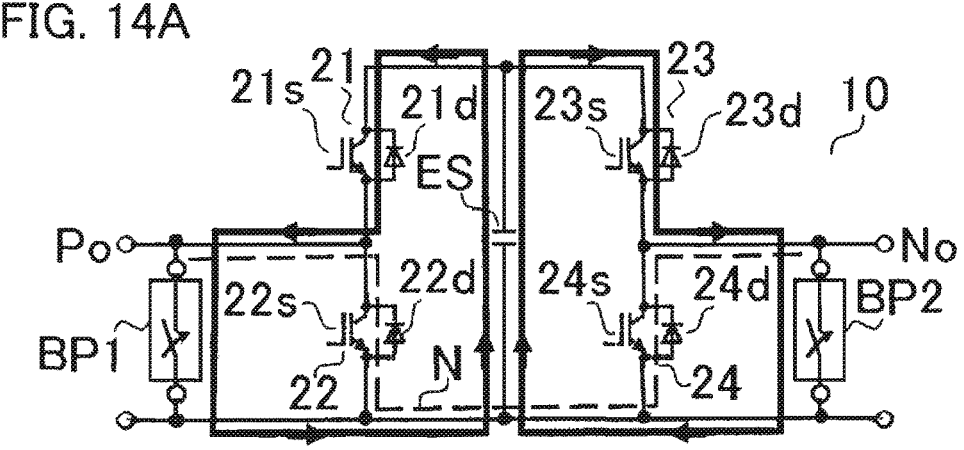
FIGS. 14A, 14B and 14C are circuit diagrams each for explaining an example of problems which occur in the other converter cells.
Figure 14B:
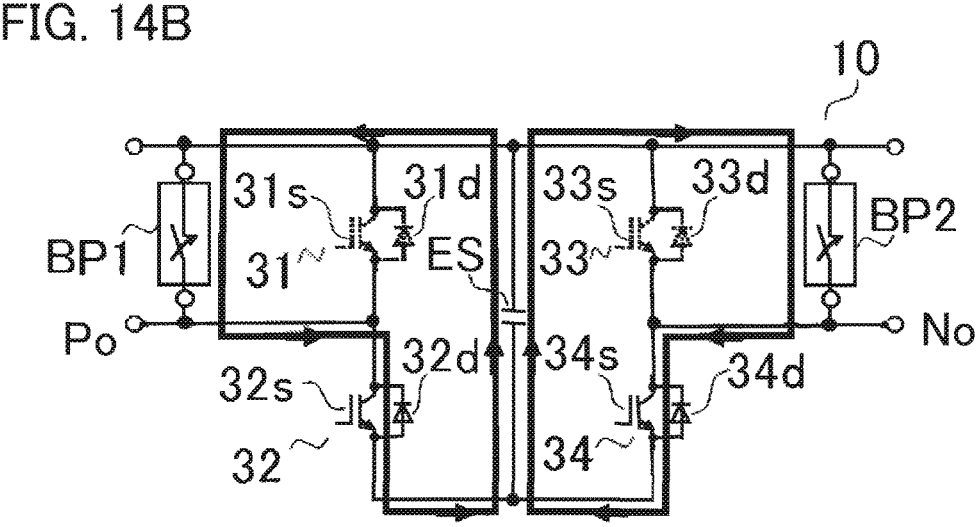
Figure 14C:
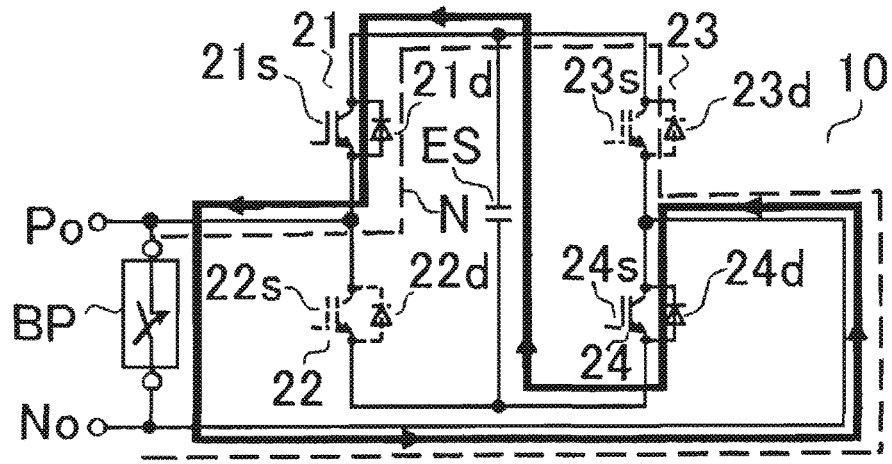

Meanwhile, when consideration is given to an operation at the time of abnormality, it is feared that, in the converter cells of FIGS. 11A, 11B and 11C, a short-circuit current(s) of the energy storage element ES flows through the bypass elements BP1 and/or BP2, so that the bypass elements BP1 and/or BP2 are damaged, as illustrated in FIGS. 14A, 14B and 14C. Basically, the consideration given to half-bridge converter cells in Embodiment 1 can be similarly taken. That is to say, even when a redundant design is administered, it is feared that this bypass element BP may be subjected to a severe usage condition associated with its close-circuit operation; if the bypass element is damaged due to the severe usage, reliable open-circuit and close-circuit operations cannot be subsequently performed, so that the continuity of operations as a power conversion device cannot be secured.

As a first case in which a short-circuit current(s) flows, a case conceivable in which, in a state in which a semiconductor device(s) with which the bypass elements BP1 and/or BP2 are not connected in parallel is in a short-circuit fault, the bypass element BP1 or BP2 is set close-circuited. In this case, when the bypass element BP1 or BP2 is to be set close-circuited, damage of the bypass element is prevented by turning on, at the same time or in advance, the semiconductor devices 22, 24, 31 and/or 33 with which the bypass element to be set close-circuited are connected in parallel. Specifically, in FIGS. 11A, 11B and 11C, when a short-circuit state is caused in a case in which the semiconductor devices 21, 23, 32 and/or 34 are damaged, a short-circuit current(s) from the energy storage element ES flows through the bypass elements BP1 and/or BP2 when they are switched on, and so it is feared that the bypass elements BP1 and/or BP2 may be damaged; because of this, after having set the semiconductor devices 22, 24, 31 and/or 33 turned on with which the bypass element(s) being in a turn-off state(s) are connected in parallel, the bypass element BP1 or BP2 is to be set close-circuited. That is to say, in parallel with the bypass elements BP1 and BP2, another current path (path of a broken line named as symbol "N" in FIG. 14A, reaching from Po to No, while passing through the semiconductor devices 22 and 24) in which these bypass elements EP1 and BP2 are not included is formed, so that damage of the bypass elements BP1 and BP2 is prevented.

As a specific example of the abnormality described above, there is abnormality of a control power-supply (not shown in FIGS. 6A and 6B). The control power-supply means an electric power source supplied into a gate drive unit for performing turn-on/turn-off operations on semiconductor devices, and an electric power source supplied into a control board which determines turn-on/turn-off logic. As a detection method of this abnormality, there is a method in which a voltage of a control power-supply is detected, and determination is performed by a comparator (comparison unit) whether or not the voltage is within that of a normal operation range. Using this method, the abnormality can be detected.

In order to set the bypass element BP close-circuited, a control voltage is supplied to a control terminal (not shown in the figures) or control coil (not shown in the figures) of the bypass element BP.

In addition, as a second case in which a short-circuit current flows, there arises a case in that the bypass element BP1 or BP2 is set close-circuited due to its misoperation by noise or the like. In this case, by including an arm short-circuit protection unit in a gate drive unit of a semiconductor device(s) with which the bypass elements BP1 and BP2 are not connected in parallel, damage of the bypass element BP1 or BP2 can be prevented.

The explanation will be made in more detail below for a specific severe condition in which a short-circuit current flows through the bypass elements described above, so that it is feared that these bypass elements may be damaged.

As for the severe condition, there are two cases conceivable when it is broadly divided; a first case is a case in which the fault detection unit 30 detects abnormality of the converter cell 10, and, based on the detection, the bypass element BP is close-circuited, which is primarily a normal close-circuit operation, so to speak, as the bypass element BP; however, when the abnormality of the converter cell 10 is caused by a short-circuit fault of any one of the semiconductor devices 21 through 24 as will be described in detail in the following paragraphs, an excessively large current flows to a large extent due to electric energy-charges having been charged in the energy storage element ES by way of the semiconductor device being in the short-circuit fault through the bypass element BP being close-circuited, so that it would be probable that the bypass element BP is damaged due to the excessively large current.

In addition, a second case is a case in which the bypass element BP is close-circuited in a state of the fault detection unit 30 not detecting abnormality of the converter cell 10, so to speak, the case that the bypass element BP performs the close-circuit operation due to its misoperation. In this case, as will be described later in detail in the paragraphs, an electric discharge current flows due to electric charges having been charged in the energy storage element ES, by way of semiconductor devices which are at the time in turn-on states, through the bypass element BP close-circuited by the misoperation; there arises the case in that, if this is left unattended to expiration, those semiconductor devices develop into short-circuit states, and, associated with them, the electric discharge current sharply increases, so that it would be probable that the bypass element BP might get damaged.

First, the explanation will be made for the first case referring to FIG. 14C. Here, the fault detection unit 30 is so arranged that it detects comprehensive abnormality of the converter cell 10 to be presumed.

The arrows indicated with the heavy line of FIG. 14C show a short-circuit current flowing in a case in which the bypass element BP is close-circuited when the semiconductor devices 21 and 24 diagonally positioned to each other are in short-circuit states: the current flows from the energy storage element ES through the bypass element BP by way of the semiconductor devices 21 and 24 in the short-circuit states.

In the first place, the bypass element BP is designed at a value of electric current which flows through converter cells in ordinary times of power conversion operations. Usually, this electric current is several kA or less. Meanwhile, the aforementioned short-circuit current reaches to several tens to several hundreds of kA. Hence, due to this short-circuit current, it would be probable that the bypass element BP being close-circuited might get damaged; in that case, the power conversion device cannot continuously perform the operations of electrical power conversion. In other words, the reliability is lowered. Note that, the same also applies to a case in which the semiconductor devices 22 and 23 diagonally positioned likewise to each other are in short-circuit states.

For dealing therewith, when the fault detection unit 30 detects abnormality of the converter cell 10, it is presumed that the semiconductor devices are in the short-circuit state described above, and the severest state can occur as the bypass element BP to be close-circuited; as an object in order to avoid this in the present invention, the switching elements 21s and 23s of upper arms are set in turn-on states at the same time when the bypass element BP is close-circuited or in advance of its close circuit. By controlling the switching elements 21s and 23s of upper arms in turn-on states, the output terminals Po and No are short-circuited therebetween by the semiconductor devices. As a result, in parallel with the bypass element BP, there formed is another current path (path of a broken line named as symbol "N" in FIG. 14C, reaching from Po to No, while passing through the switching elements 21s and 23s) in which the bypass element BP is not included.

Note that, because the semiconductor device 21 being in a short-circuit state is already in a turn-on state, the semiconductor device effectively controlled to be turned on is only the switching element 23s that is not faulty.

As described above, the semiconductor devices 23 and 24 become the turn-on state and the short-circuit state, respectively, so that the energy storage element ES discharges through the short-circuits by way of these semiconductor devices 23 and 24. In other words, by short-circuiting between the output terminals Po and No by using semiconductor devices before the bypass element BP is to be switched on, those semiconductor devices are sacrificed earlier than the bypass element BP would be, and so the protection against an overcurrent is achieved. Specifically, by controlling the switching elements so as short-circuit between the output terminals Po and No by way of the semiconductor devices, the energy storage element ES is short-circuited by way of those semiconductor devices, so that the electric energy-charges having been charged in the energy storage element ES is to be consumed; it can be understood that an electric current flowing from the energy storage element ES into the bypass element BP becomes zero or is significantly reduced, and an electric current flowing through the bypass element BP remains at a value in the same degree of a load current primarily as the power conversion device, so that the damage can be reliably prevented.

Note that, usually, even when a signal is given to the bypass element BP to implement its "close circuit," several ms or more are generally required in a case of a mechanical switch of vacuum switch or the like, whereas a switching element can be turned on by several μs.

Namely, it is comparatively easy to make a close-circuit response time from a close-circuit instruction until an actual activation to close-circuit in the bypass element BP longer than a turn-on response time from a turn-on instruction until an actual activation to turn on in the switching element; and therefore it can be achieved with relative ease to set the semiconductor devices 21 and 23 in turn-on states before the bypass element BP is to be close-circuited.

In addition, the arrangement is made to set the switching elements 21s and 23s of the upper arms in turn-on states in the explanation described above; this is because, in order to adopt a protective operation, presuming a second case as will be described later, for setting the switching elements in turn-off states by the same device or unit, it is so arranged that a protective operation to set in turn-on states and a protective operation to set in turn-off states are performed being shared by the upper-arm elements and the lower-arm elements, respectively. Therefore, it may be so arranged that the protective operation to set in the former turn-on states is burdened by the lower-arm elements, and that the protective operation to set in the latter turn-off states, by the upper-arm elements.

Moreover, when only the protective operation is performed to set in the former turn-on states, it may be so arranged as to be burdened by both the upper and lower-arm elements. In this case, because electric discharge currents which flow from the energy storage element ES into the semiconductor devices are divided into two circuits, the electric currents to flow into each of the semiconductor devices are lowered.

Next, referring to FIG. 15, the explanation will be made for an operation to protect a bypass element(s) against a specific severe condition in which a short-circuit current flows through the bypass element(s) described above, so that it is feared that the bypass element(s) may be damaged.

Figure 15:
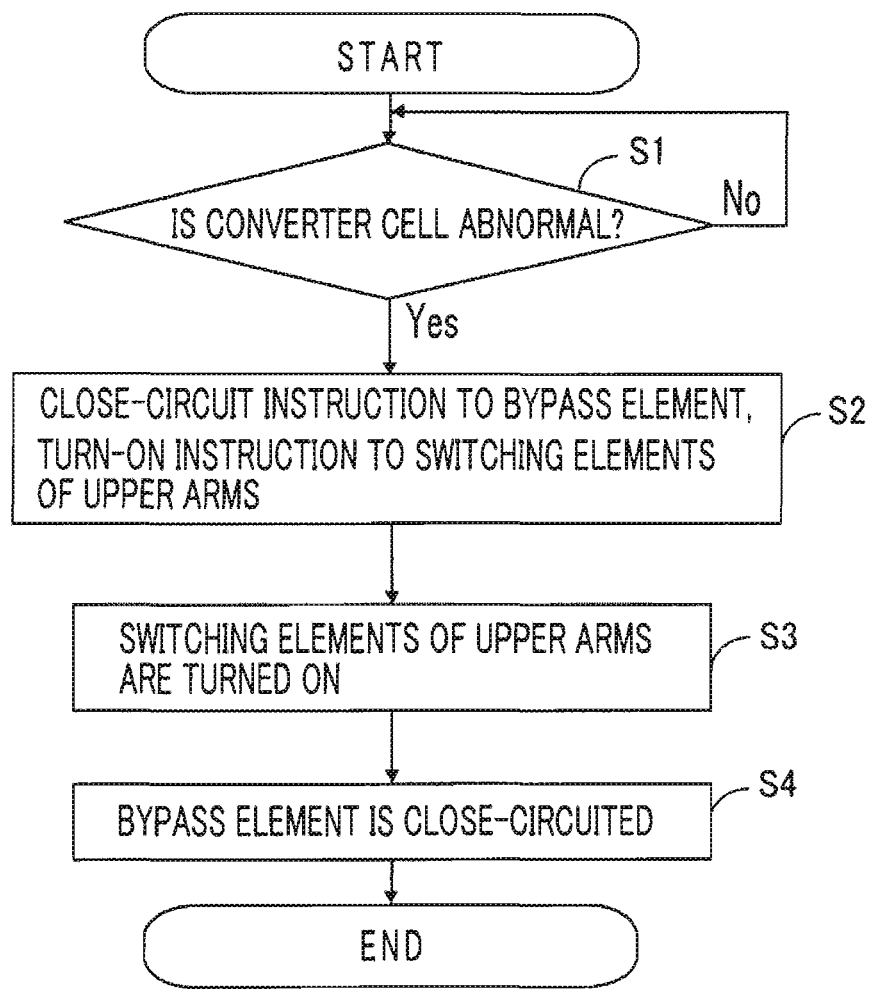
FIG. 15 is a chart showing flows for explaining a protective operation to cope with a first case severe to a bypass element HP.

FIG. 15 is a flowchart showing a protective operation of a bypass element(s). In FIG. 15, determination is distinguishably made by the fault detection unit 30 whether or not the converter cell 10 is abnormal (Step S1); if abnormality is caused ("Yes" at Step S1), it is required to bypass the converter cell, so that a "close-circuit" instruction is given to the bypass element BP, and also a turn-on instruction is given to the switching elements 21s and 23s of upper arms (Step S2). According to the manner of processing described above, the switching elements 21s and 23s of upper arms are set in turn-on states (Step S3), and, at the same time of their turn-on or a subsequent time thereof, the bypass element BP is set close-circuited (Step S4).

Figure 16:
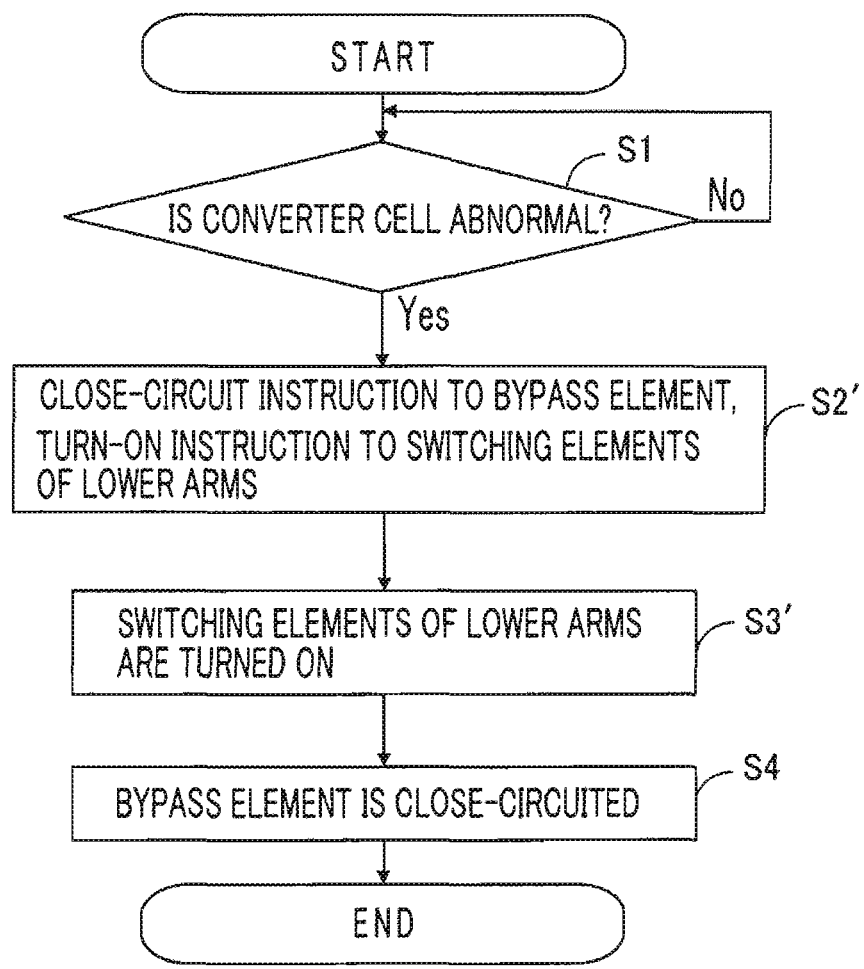
FIG. 16 is another chart showing flows for explaining a protective operation to the same effect as FIG. 15 that a portion of the protective operation under consideration differs.

Another flowchart is exactly shown as FIG. 16 in which the protective operation to set in the turn-on states described above is burdened by the lower-arm elements.

Note that, when the switching element 23s of upper arm in FIG. 14C described before is set in a turn-on state ahead of the close-circuit of the bypass element BP, a direct discharge short-circuit current from the energy storage element ES which is substantially larger than the current through the bypass element BP flows into the switching element 24s being already in the short-circuit state and the switching element 23s newly turned on, so that it would be probable to a large extent that the switching element 23s might also get damaged due to this short-circuit current.

However, even if the switching element(s) in the converter cell 10 where abnormality is detected reaches to damage associated with its protective operation to set the switching element(s) in a turn-on state at the time when it has been normal, it is the underlying purpose of the present invention to strictly achieve continuous operations of the power conversion device, in a time-period from the occurrence of abnormality in the converter cell 10 to a subsequent time until the power conversion device can be ceased in a planned manner, by reliably preventing damage of the bypass element BP associated with the abnormality of the converter cell 10 and securing the bypass function of the bypass element BP; and thus, the damage of the switching element(s) described above is an event within the scope in which the present invention takes into consideration.

As described above, the protective operation to set the switching elements explained by referring to FIG. 15 in turn-on states is the operation carried out presuming the first case described above in which, when the fault detection unit 30 detects abnormality of the converter cell 10, the abnormality becomes the severest to the bypass element BP regardless of a type of the detected abnormality event, so that the operation is for reliably preventing the bypass element EP from the damage thereto.

Note that, the protective operation at the time of fault detection in which the output terminals Po and No are short-circuited therebetween by semiconductor devices is applicable to abnormality detected by the fault detection unit 30 not even being due to a short-circuit fault of a semiconductor device(s), but also due to another type of abnormality event in the converter cell 10. That is to say, when the abnormality is not due to a short-circuit fault of a semiconductor device(s) but due to another type of abnormality event in the converter cell 10, there exists no path for the energy storage element ES to be short-circuited thereacross, even when the output terminals Po and No are short-circuited therebetween by controlling the switching elements 21s and 23s of upper arms to be in turn-on states, so that electric energy-charges having been charged in the energy storage element ES do not undergo consumption. Meanwhile, semiconductor devices short-circuit across the output terminals Po and No earlier in time than the bypass element BP, so that it is possible to transfer to the bypass state at an early stage. Hence, the operational continuity of a more reliable power conversion device is made possible.

By the way, a typical event presumed in the first case as a short-circuit fault of a semiconductor device(s), in particular, of a switching element(s) is such an event that a portion of the semiconductor is damaged so that the insulation of a gate oxide film is destroyed, resulting in approximately a short-circuit state between the gate and the emitter. The explanation has been briefly made for that this abnormality can be detected from a state of a control power-supply in the gate drive unit 40; based on specific examples, the explanation will be made in more detail for the content as follows.

Figure 17:
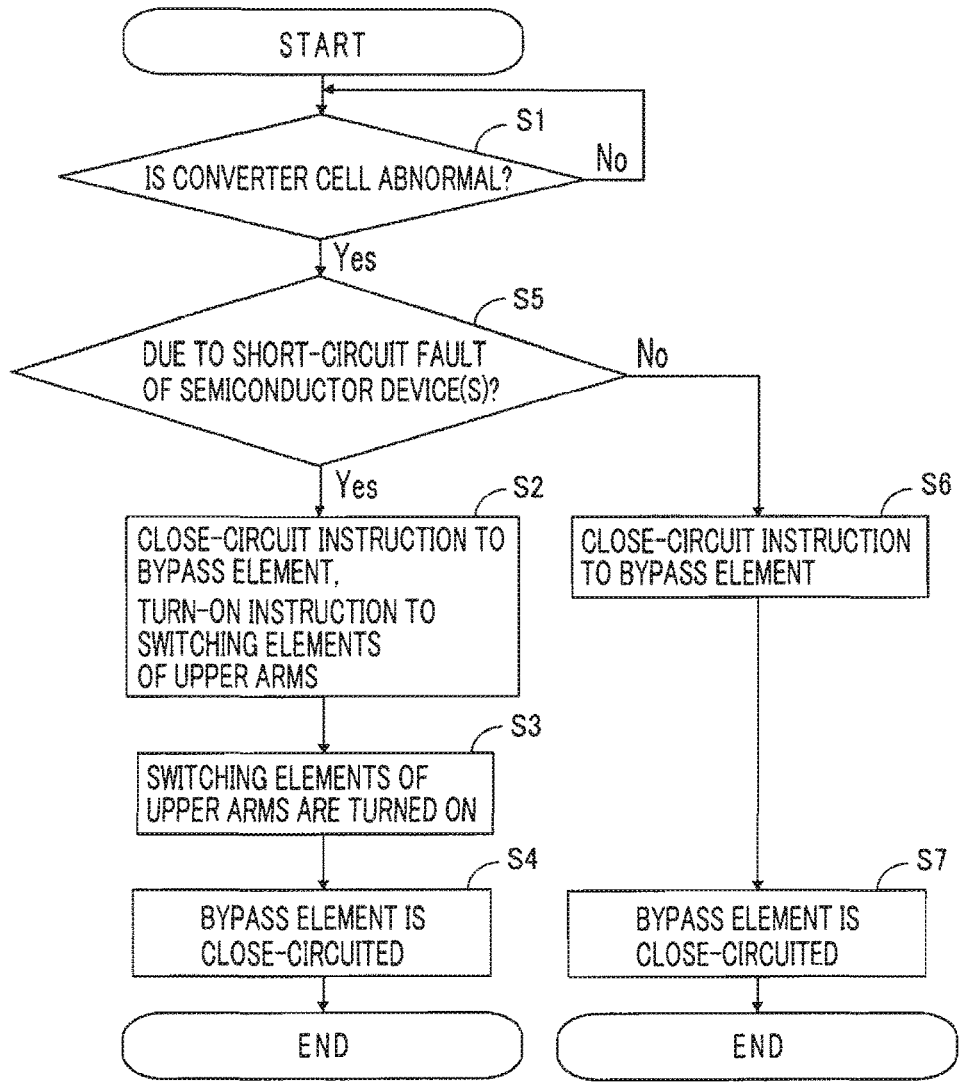
FIG. 17 is a further chart showing flows for explaining a protective operation to the same effect as FIG. 15 that a portion of the protective operation under consideration differs.

FIG. 17 is a further flowchart, which differs from the case in FIG. 15, showing a protective operation in which a fault detection unit is adopted as the fault detection unit 30 in that abnormality of the converter cell 10 can be detected by distinguishing a short-circuit fault of a semiconductor device(s) from another fault thereof, and a protective operation to set switching elements in turn-on states by presuming the first case described above is carried out by limiting the protective operation to a case in which the detected fault is a short-circuit fault of a semiconductor device(s).

In FIG. 17, determination is distinguishably made by the fault detection unit 30 whether or not the converter cell 10 is abnormal (Step S1), and, if it is abnormal ("Yes" at Step S1), further determination is distinguishably made whether or not the abnormality is due to a short-circuit fault of a semiconductor device(s) (Step S5). If it is due to short-circuit fault of a semiconductor device(s) ("Yes" at Step S5), a close-circuit instruction is given to the bypass element BP, and also a turn-on instruction is given to the switching elements 21s and 23s of upper arms (Step S2). According to the manner of processing described above, the switching elements 21s and 23s of upper arms are set in turn-on states (Step S3), and, at the same time of their turn-on or a subsequent time thereof, the bypass element BP is set close-circuited (Step S4).

At Step S5, when the determination is distinguishably made that the detected fault is not a short-circuit fault of a semiconductor device(s) ("No" at Step S5), a process is performed to only give a close-circuit instruction to the bypass element BP (Step S6), and, without instructing turn-on operations of the switching elements, the bypass element BP is set close-circuited (Step S7).

According to this arrangement, the number of processes according to the protective operation can be reduced, so that portions related to the protection and control can be made smaller in size.

In FIG. 17, it is so arranged that the operations to set the switching elements in turn-on states at the same time when the bypass element BP is set close-circuited or in advance of its close circuit are carried out while limiting abnormality detected by the fault detection unit 30 is due to abnormality caused by a short-circuit fault of a semiconductor device(s) as described above, so that the frequency of protective operations to set these switching elements in turn-on states is kept at the irreducible minimum, and the portions related to the protection and control can be made smaller in size.

Next, the explanation will be made referring to FIG. 18 and FIG. 19 for a second case as the other one which is assigned as a severe condition to the bypass element EP.

Here, the fault detection unit 30 is so arranged that it detects comprehensive abnormality of the converter cell 10 to be presumed.

Figure 18:
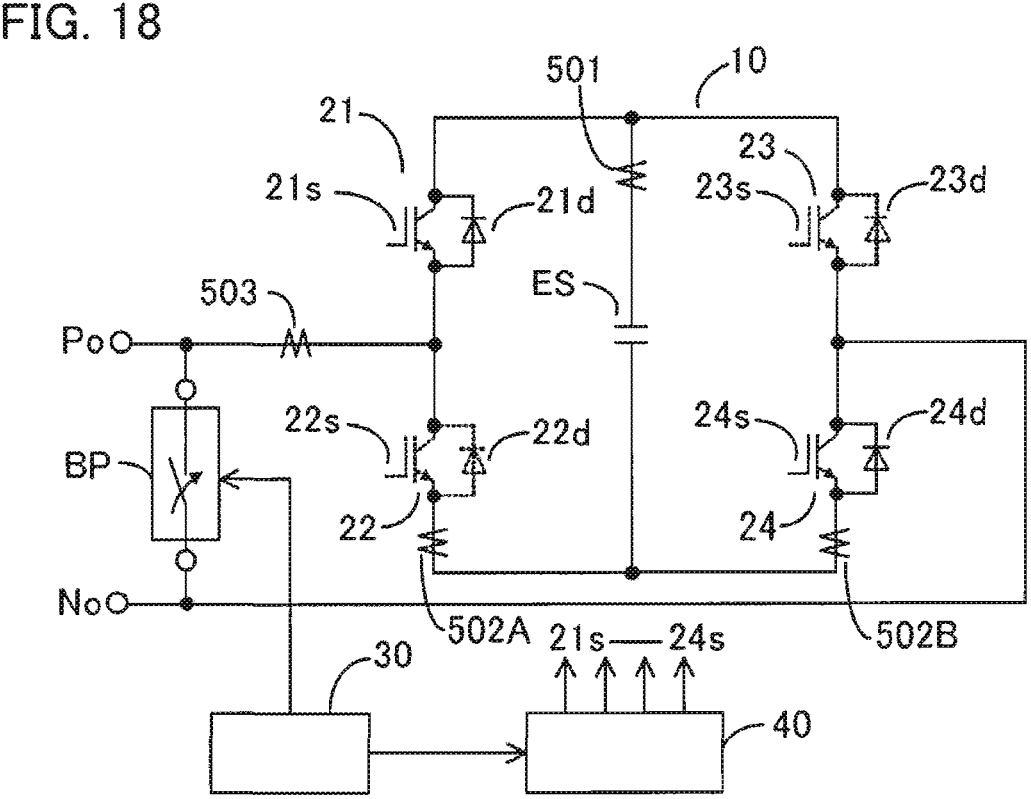
FIG. 18 is a diagram for explaining a case in which a bypass element BP is close-circuited by its misoperation so that an overcurrent flows therethrough.

The second case is a case in which, as illustrated in FIG. 18, the bypass element BP is close-circuited in a state in which the fault detection unit 30 does not detect abnormality, namely, in a state caused by misoperation, when the semiconductor devices 21 and 24 diagonally positioned to each other are controlled in turn-on states, for example.

Note that, in FIG. 18, the semiconductor devices 21 and 24 controlled in turn-on states are shown by the solid lines, and the semiconductor devices 22 and 23 controlled in turn-off states, by the dotted lines.

In this case, the energy storage element ES is short-circuited by the bypass element BP being close-circuited and the semiconductor devices 21 and 24 in turn-on states. When a semiconductor device(s) within a short-circuit path is not faulty, a short-circuit current is limited to a value referred to as a saturation current (usually, in the degree of several kA). However, if this is left unattended to expiration, the semiconductor devices reach to be faulty generally by several tens of μs, and becomes completely in a short-circuit state, so that an electric current of the bypass element BP increases at a point in time from several tens of kA to several hundreds of kA as described above, and so it is feared that the bypass element BP may be damaged.

In order to prevent this happening, an arm short-circuit protection unit is here included in the gate drive unit 40 for driving the switching elements 22s and 24s of lower arms. Note that, the arm short-circuit protection unit is here referred to as the unit constituted of current sensors indicated by "502A," "502B," etc. in FIG. 18, an overcurrent detection unit for detecting an overcurrent of a semiconductor device(s) from sensed outputs of those current sensors, and a drive unit for clearing a short-circuit state of the energy storage element ES, by setting the switching elements in turn-off states when the overcurrent is detected, where the state is formed by way of the bypass element BP being close-circuited due to its misoperation, and the semiconductor devices 21 and 24.

Note that, the "arm short-circuit protection unit" is stated in the explanation above; however, there also arises a case in which, as a portion to protect an element(s) against a short-circuit in the outer side of the output terminals, "load short-circuit protection unit" is stated. Here, the term referred to as an "arm short-circuit protection unit" is used collectively as a portion for protecting a semiconductor device(s) from a short-circuit current.

The arm short-circuit protection unit interrupts the switching elements 22s and 24s of the lower arms by directly or indirectly detecting that a short-circuit current flows through semiconductor devices. Therefore, as the current sensors, they may be adopted such as a current sensor 501 shown in FIG. 18 that one of them is connected between an end of the energy storage element ES and both ends of the semiconductor devices 21 and 23, and may be adopted such as current sensors 502A and 502B shown in the figure that each of which is provided immediately near to the semiconductor device 22 or 24 of the lower arms, or, in a case of module-type devices, is built in the semiconductor device 22 or 24. In addition, one of the current sensors may be adopted such as the current sensor 503 that it is connected between the connecting portions of the semiconductor devices and the bypass element BP.

In the explanation described above, the arrangement is made to set the switching elements 22s and 24s of the lower arms in turn-off states; this is because, in order to adopt a protective operation, presuming the aforementioned first case, for setting the switching elements in turn-on states by the same device or unit, it is so arranged that a protective operation to set in turn-on states and a protective operation to set in turn-off states are performed being shared by the upper-arm elements and the lower-arm elements, respectively.

Therefore, it may be so arranged that the protective operation to set in the former turn-on states is burdened by the lower-arm elements, and that the protective operation to set in the latter turn-off states, by the upper-arm elements.

Moreover, when only the protective operation is performed to set in the latter turn-off states, it may be so arranged as to be burdened by both the upper and lower-arm elements.

Figure 19:
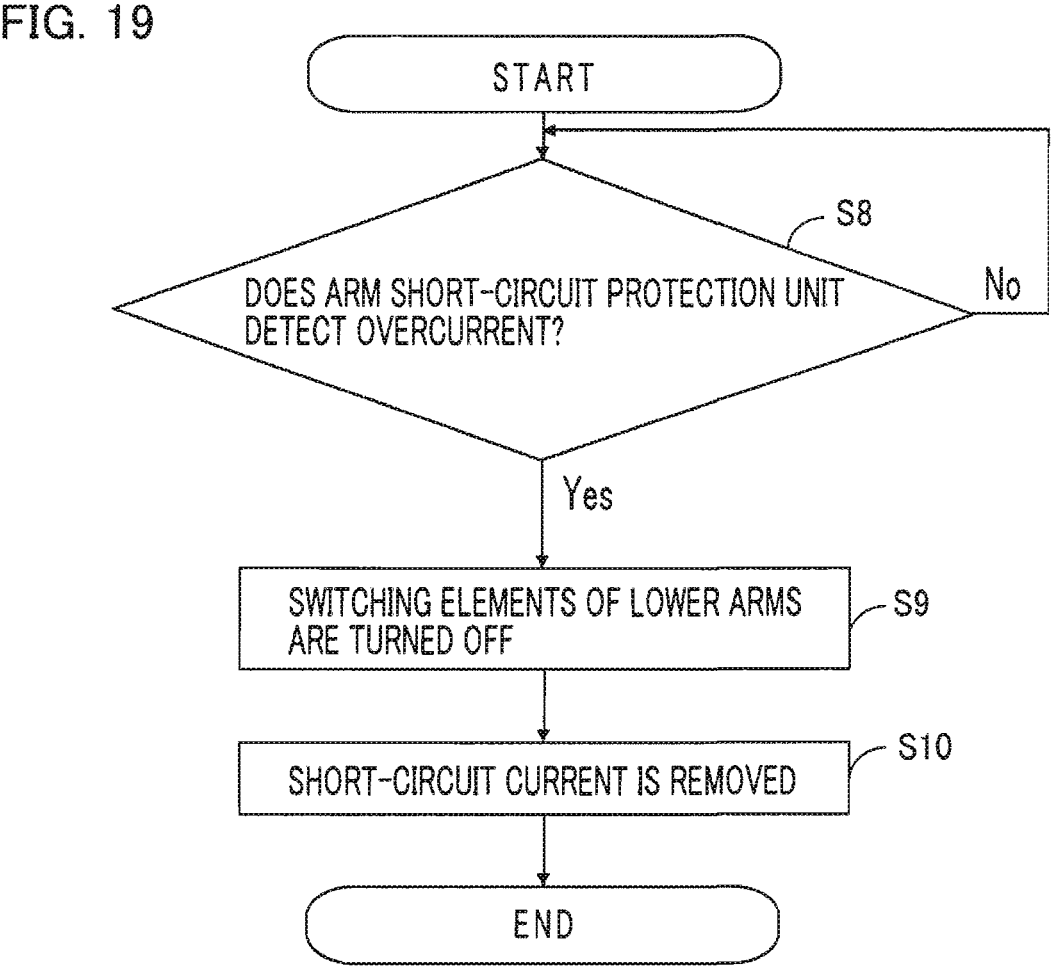
FIG. 19 is a chart for explaining a case in which a bypass element BP is close-circuited due to its misoperation so that an overcurrent flows therethrough.

FIG. 19 shows a flowchart of the protective operation described above. In FIG. 19, in a state in which the fault detection unit 30 does not detect abnormality of the converter cell 10, if an arm short-circuit protection unit detects an overcurrent ("Yes" at Step S8), a turn-off instruction is given to the switching elements 22s and 24s of lower arms, and these switching elements 22s and 24s are set to be turn-off states (Step S9). According to this arrangement, the short-circuit current is removed (Step S10).

Figure 20:
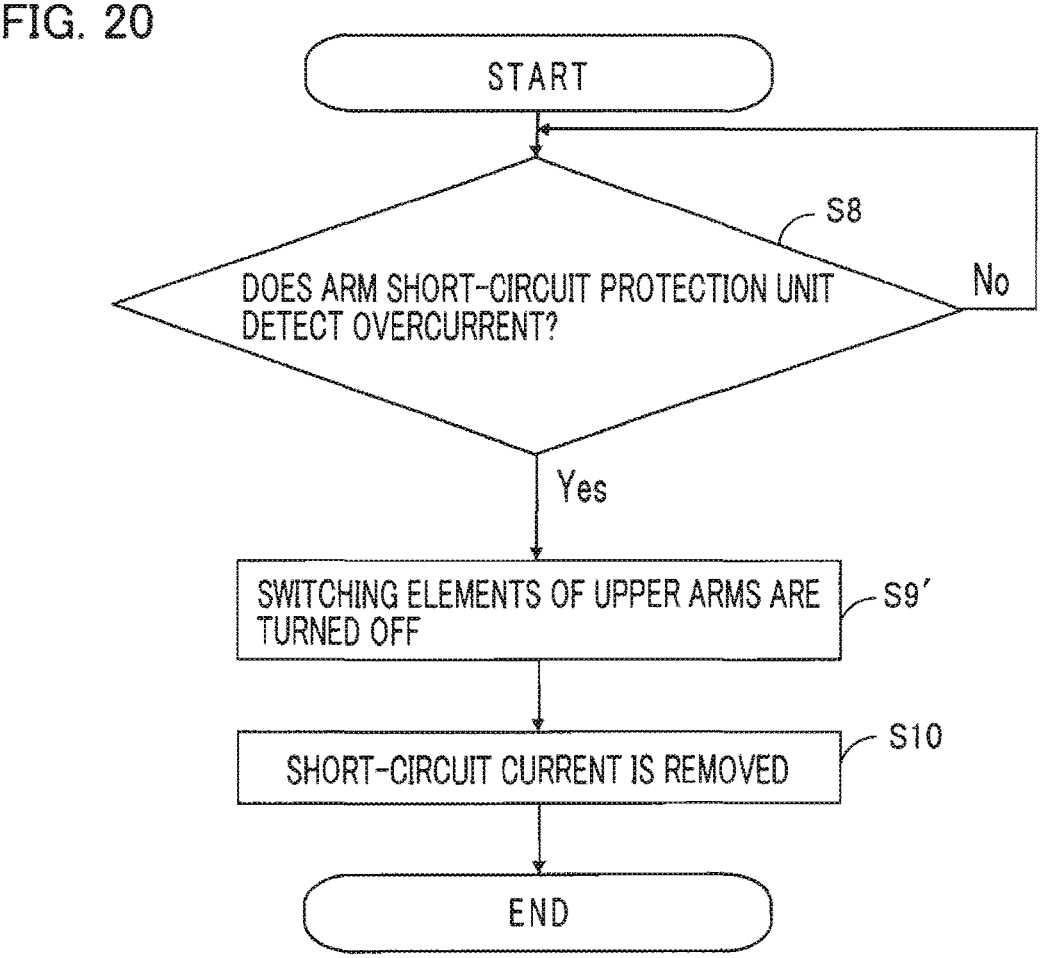
FIG. 20 is another chart showing flows for explaining a protective operation to the same effect as FIG. 19 that a portion of the protective operation under consideration differs.

Note that, another flowchart is exactly shown as FIG. 20 in which the protective operation to set in the turn-off states described above is burdened by the upper-arm elements.

By achieving a turn-off operation of these switching elements before a semiconductor device is reaching to be faulty, a short-circuit state of the energy storage element ES is cleared, so that the short-circuit current can be removed. Preferably, because high-voltage semiconductor devices used in such a circuit as that in FIG. 1 has generally overload-tolerance capability (usefulness characteristic not to be broken down) against a short-circuit current if its duration is within 10 μs, the protection can be reliably performed by carrying out a turn-off interruption within 10 μs after the short circuit occurs.

According to this protective operation, the semiconductor devices do not become faulty, so that it is possible to prevent an electric current, from several tens of kA to several hundreds of kA, from flowing through the bypass element BP. Consequently, the fault of the bypass element BP can be prevented.

By the way, when a semiconductor device is interrupted by the arm short-circuit protection unit (refer to FIG. 10), an operation named as "soft turn-off" may be implemented to perform the interruption by means of a switching operation which is delayed in time more than a switching operation under usual control. This is because a saturation current of a semiconductor device is larger than an electric current thereof being usually controlled, surge voltages produced across both ends of the semiconductor device at the time of its interruption are to be curbed.

Because the arm short-circuit protection unit itself is publicly known, its detailed explanation is omitted; however, in what follows, the explanation will be briefly made referring to FIG. 10 (refer to Patent Document 3).

FIG. 10 is a circuit diagram in which the main points are extracted from the cited publication. With respect to the semiconductor device 510 under consideration, the figure shows the detecting portion 511 to detect a short-circuit current, and the interrupting portion 512 which performs an interrupting operation when the short-circuit current is detected.

The detecting portion 511 to detect a short-circuit current detects whether a collector potential is a predetermined voltage or more when a turn-on signal is entered into the semiconductor device 510. When the semiconductor device is short-circuited, it is in a state in which a voltage of the energy storage element ES is applied across both ends of the semiconductor device, so that a voltage thereof in the turn-on state rises. On the other hand, in a case of not being in a short-circuit state, a voltage drop of the semiconductor device is several V. The detecting portion 511 determines whether or not a short-circuit current is in a state of flowing by detecting the collector potential and comparing it using a comparator.

Meanwhile, the interrupting portion 512 performs the interruption by receiving a signal from the detecting portion 511. At the time of the interruption as exactly described above, an operation named as "soft turn-off" is achieved by performing the interruption through a larger resistance than that at the time of interruption in steady-state operations.

Figure 21:
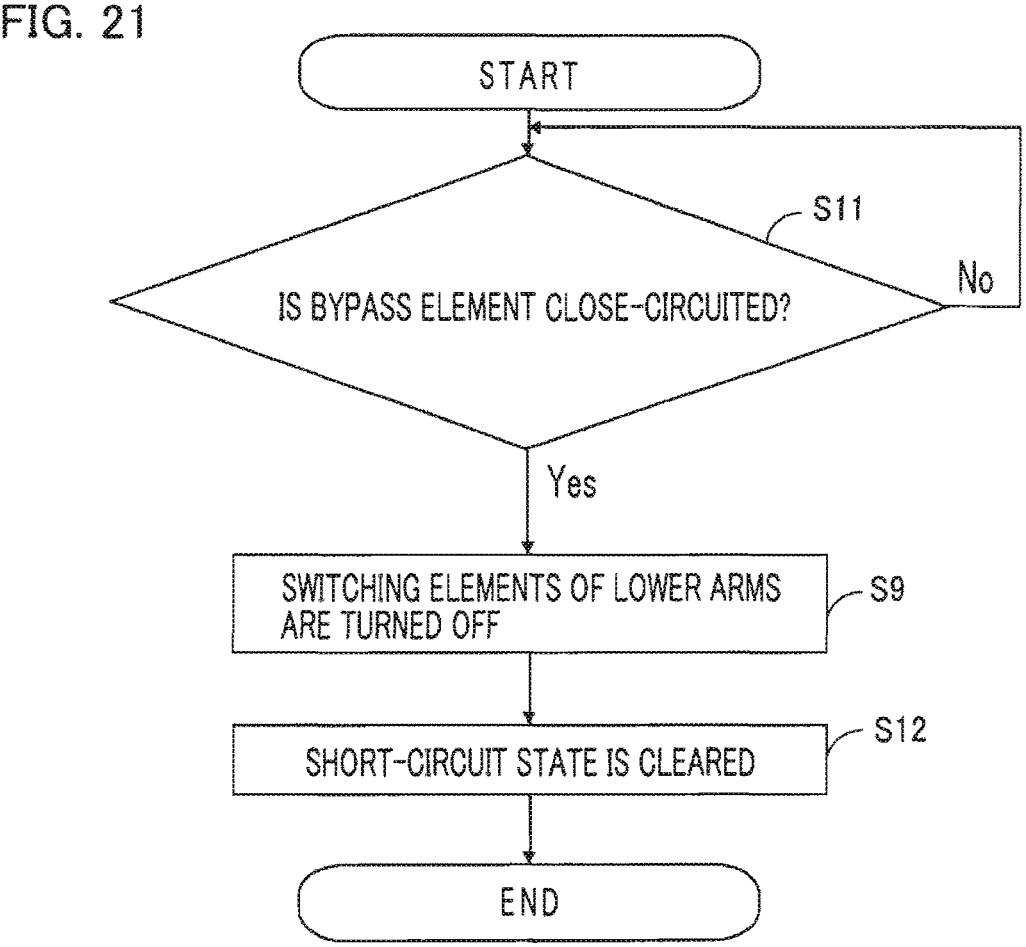
FIG. 21 is a further chart showing flows for explaining a protective operation to the same effect as FIG. 19 that a portion of the protective operation for a condition differs.

Note that, in the protective operation in FIG. 19, it is so arranged that, when an overcurrent of a semiconductor device(s) is detected in a state in which abnormality of the converter cell 10 is not detected, unwanted protective operations are curbed at a level not giving the influence to the protection of the bypass element BP, by turning off the switching elements of lower arms so that the short-circuit current is removed; however, as shown in FIG. 21, may be so arranged that the requirement for the overcurrent detections is not imposed.

Namely, in a state in which the fault detection unit 30 does not detect abnormality of the converter cell 10 in the further flowchart of FIG. 21, if detection is made where the bypass element BP is close-circuited ("Yes" at Step S11), a turn-off instruction is given to the switching elements 22s and 24s of lower arms, and these switching elements 22s and 24s are set to be in turn-off states (Step S9). According to this arrangement, the short-circuit state of the energy storage element ES, formed by way of the bypass element BP being close-circuited and the semiconductor devices, is cleared (Step S12).

Note that, the close-circuit operation of the bypass element BP can be detected by sensing a voltage across both ends of the bypass element BP, or by monitoring an auxiliary contact which performs the same open-circuit and close-circuit operations with a main contact of the bypass element BP.

In this case, the frequency of protective operations to set the switching elements in turn-off states is increased; however, while reliably protecting the bypass element BP, configuration and operation of the protective circuitry can be made convenient.

It should be noted that, in Embodiment 2, the converter cell is configured by a full-bridge, which differs from that in Embodiment 1, and so, when abnormality is detected in a converter cell, both of the bypass elements EP1 and BP2 are set close-circuited. Under this situation, semiconductor devices connected in parallel with the bypass elements are also set to be turned on at the same time or in advance of their close circuits. According to the manner described above, a converter cell in which its abnormality occurs can be reliably bypassed. In addition, the frequency of protective operations to set these switching elements in turn-on states is kept at the irreducible minimum, and the portions related to the protection and control can be made smaller in size.
Embodiment 3.

Figure 22:
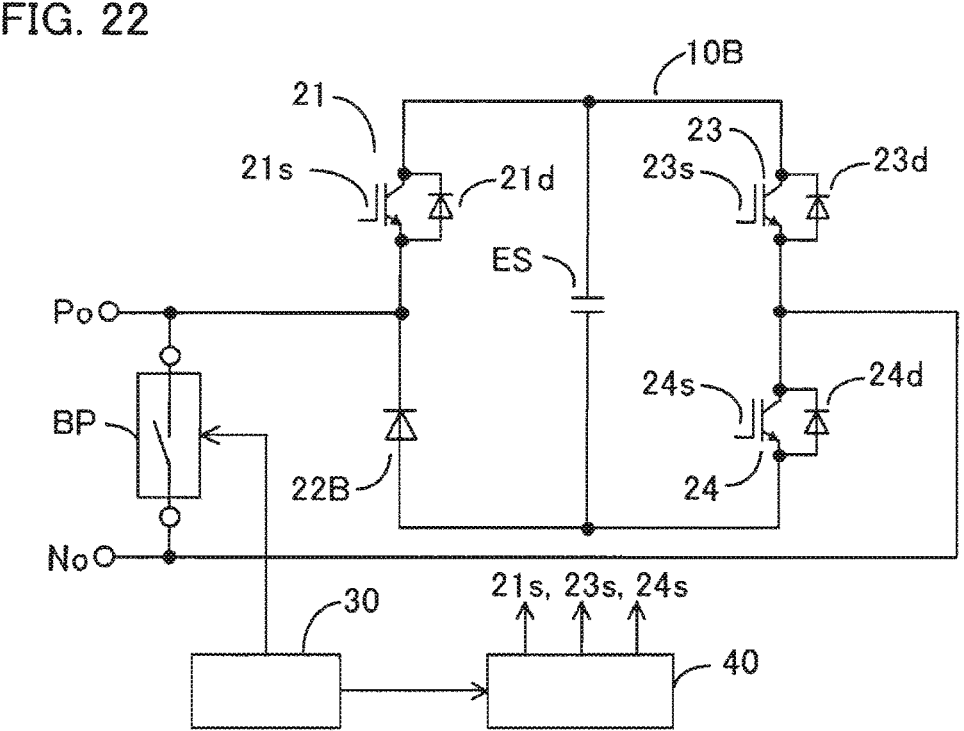
FIG. 22 is a circuit diagram illustrating an internal configuration of a converter cell of a power conversion device according to Embodiment 3 of the present invention.

FIG. 22 is a circuit diagram illustrating an internal configuration example of a converter cell 10B used in a power conversion device according to Embodiment 3 of the present invention; In Embodiments 1 and 2 described above, switching elements and diode elements are used for all of the semiconductor devices in the converter cell 10; however, in Embodiment 3, it differs in the point that a semiconductor device of lower arm of one leg in the two legs is configured only by a diode element. In what follows, the explanation will be made by focusing on the different point.

Each of the arms of the converter cell 10B is made of respective semiconductor devices 21, 22B, 23 and 24, and the energy storage element ES and the bypass element BP are connected thereto as shown in the figure. Among these arms, the semiconductor device 22B is made only of a diode element; and the other three arms are constituted of the switching elements 21s, 23s and 24s, and the diode elements 21d, 23d and 24d connected in antiparallel therewith, respectively.

In FIG. 22, at the connection point between the semiconductor devices 21 and 22B, the output terminal Po of the converter cell 10B is provided, and, at the connection point between the semiconductor devices 23 and 24, the output terminal No of the converter cell 10B.

Each of the switching elements 21s, 23s and 24s is controlled by turn-on/turn-off operations based on gate driving signals from the gate drive unit 40. And then, by performing the turn-on/turn-off control on the switching elements 21s, 23s and 24s and performing the electrical power conversion between a pair of the output terminals Po and No, and the energy storage element ES, it is possible to output, between the output terminals of the converter cell 10B, any one of a positive voltage across both ends of the energy storage element ES, or a zero volt, or a negative voltage across both ends of the energy storage element ES, because, depending on a polarity of the electric current, the semiconductor device 22B can be made conducting.

Although, in comparison with the converter cell 10 of FIG. 11C, the converter cell 10B of FIG. 22 is degraded in its controllability, steady-state operations disclosed in Non-Patent Document 1 described above can be achieved. Moreover, in comparison with the converter cell 10 of FIG. 11C, a small-size and inexpensive power conversion device can be achieved because the number of the switching elements is smaller.

Figure 23:
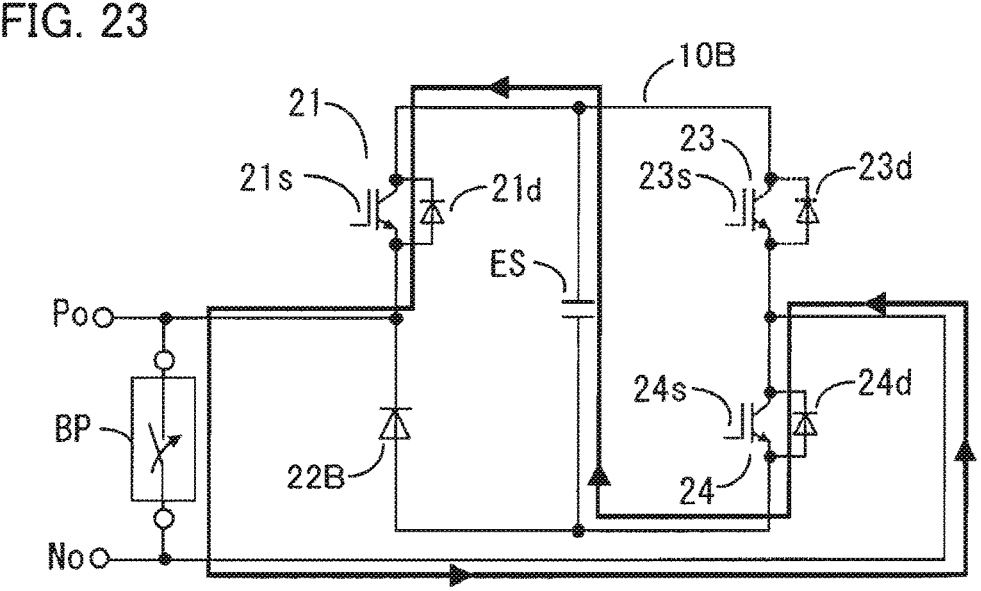
FIG. 23 is a diagram for explaining a case in which the bypass element BP is close-circuited while semiconductor devices are in a state of short-circuit faults.

Also in the case of the converter cell 10B of FIG. 22, it would be probable that, in such a case that the semiconductor devices 21 and 24 diagonally positioned to each other are in short-circuit states, for example as illustrated in FIG. 23, which are detected by the fault detection unit 30 to perform a close-circuit operation, the bypass element BP may be subjected to a severe condition explained as the first case and the second case in Embodiment 1 described above; in order to cope therewith, namely, in order not to damage the bypass element BP under the severe condition, protective operations are required.

It is understandable though that the details of those protective operations are exactly explained above in Embodiment 1, so that their repeated explanation is omitted.

However, one of the four semiconductor devices is configured only by a diode element, and a switching element is not used in place of it in Embodiment 3; and therefore, in a protective operation in which, in regard to the first case described above, a switching element is set in a turn-on state so that the output terminals Po and No are short-circuited therebetween by way of semiconductor devices, at the same time when the bypass element BP is set close-circuited or in advance of its close circuit, the switching element 23s of upper arm is limited to itself, for example in the case of FIG. 23, as the switching element under consideration to be set in the turn-on state.

As described above, except in cases where, from a viewpoint of the applications, part of them is limited to, the power conversion device according to Embodiment 3 achieves such effects that, similarly to the manners as described before in Embodiment 1, a bypass element for close-circuiting the cell's output terminals is reliably prevented from damage associated with its close-circuit operation when abnormality of the converter cell occurs, and that the continuity of operations is made possible; and also it is advantageous to make a power conversion device smaller in size and more inexpensive than that in a case of Embodiment 1.

Embodiment 4.

Figure 24:
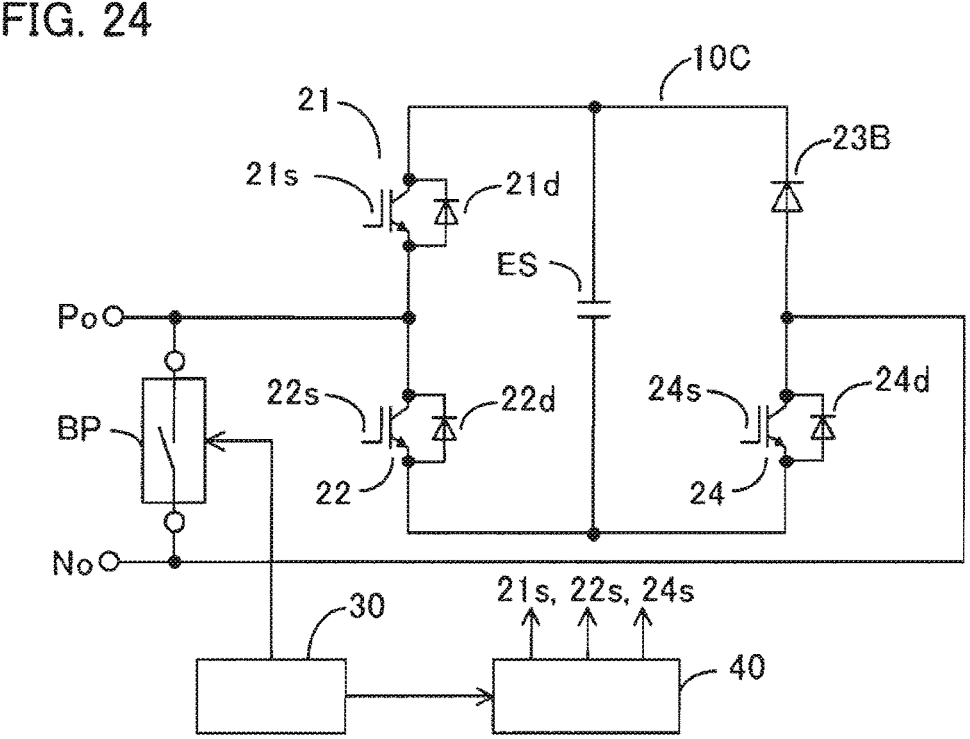
FIG. 24 is a circuit diagram illustrating an internal configuration of a converter cell of a power conversion device according to Embodiment 4 of the present invention.

FIG. 24 is a circuit diagram illustrating an internal configuration example of a converter cell 10C used in a power conversion device according to Embodiment 4 of the present invention; in Embodiment 1 described above, switching elements and diode elements are used for all of the semiconductor devices in the converter cell 10; however, in Embodiment 4, it differs in the point that a semiconductor device of upper arm of one leg in the two legs is configured only by a diode element. In what follows, the explanation will be made by focusing on the different point.

Each of the arms of the converter cell 10C is made of respective semiconductor devices 21, 22, 23B and 24, and the energy storage element ES and the bypass element BP are connected thereto as shown in the figure. Among these arms, the semiconductor device 23B is made only of a diode element; and the other three arms are constituted of the switching elements 21s, 22s and 24s, and the diode elements 21d, 22d and 24d connected in antiparallel therewith, respectively.

In FIG. 24, at the connection point between the semiconductor devices 21 and 22, the output terminal Po of the converter cell 10C is provided, and, at the connection point between the semiconductor devices 23E and 24, the output terminal No of the converter cell 10C.

Each of the switching elements 21s, 22s and 24s is controlled by turn-on/turn-off operations based on gate driving signals from the gate drive unit 40. And then, by performing the turn-on/turn-off control on the switching elements 21s, 22s and 24s and performing the electrical power conversion between a pair of the output terminals Po and No and the energy storage element ES, it is possible to output, between the output terminals of the converter cell 10C, any one of a positive voltage across both ends of the energy storage element ES, or a zero volt, or a negative voltage across both ends of the energy storage element ES, because, depending on a polarity of the electric current, the semiconductor device 23E can be made conducting.

Although, in comparison with the converter cell 10 of FIG. 11C, the converter cell 10C of FIG. 24 is degraded in its controllability, a small-size and inexpensive power conversion device can be achieved because the number of the switching elements is smaller.

Figure 25:
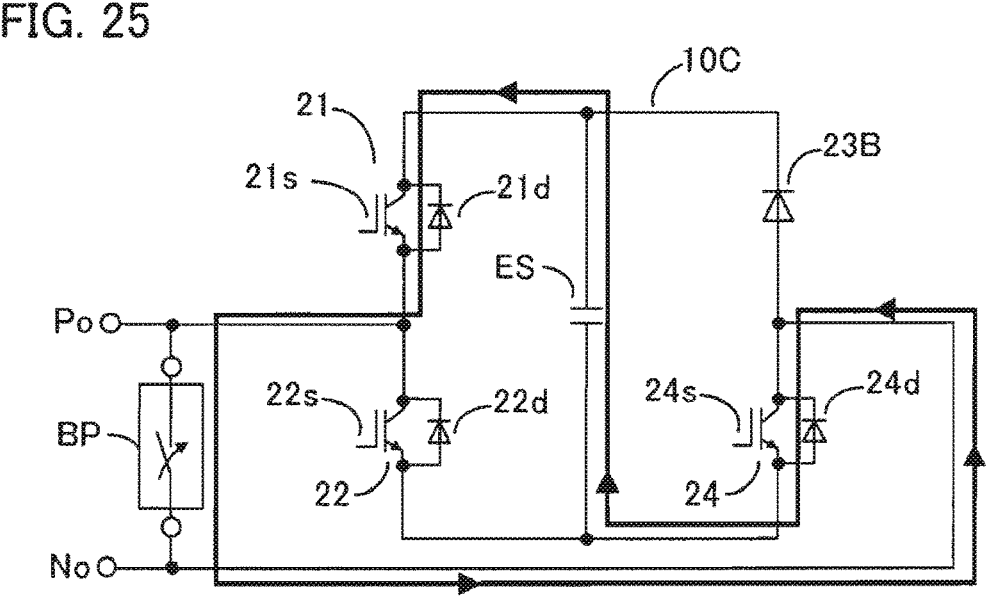
FIG. 25 is a diagram for explaining a case in which the bypass element BP is close-circuited while semiconductor devices are in a state of short-circuit faults.

Also in the case of the converter cell 10C of FIG. 24, it would be probable that, in such a case that the semiconductor devices 21 and 24 diagonally positioned to each other are in short-circuit states, for example as illustrated in FIG. 25, which are detected by the fault detection unit 30 to perform a close-circuit operation, the bypass element BP may be subjected to a severe condition explained as the first case and the second case in Embodiment 1 described above; in order to cope therewith, namely, in order not to damage the bypass element BP under the severe condition, protective operations are required.

It is understandable though that the details of those protective operations are exactly explained above in Embodiment 1, so that their repeated explanation is omitted.

However, one of the four semiconductor devices is configured only by a diode element, and a switching element is not used in place of it in Embodiment 4; and therefore, in a protective operation in which, in regard to the first case described above, a switching element is set in a turn-on state so that the output terminals Po and No are short-circuited therebetween by way of semiconductor devices, at the same time when the bypass element BP is set close-circuited or in advance of its close circuit, the switching element 22s of lower arm is limited to itself, for example in the case of FIG. 25, as the switching element under consideration to be set in the turn-on state.

As described above, except in cases where, from a viewpoint of the applications, part of them is limited to, the power conversion device according to Embodiment 4 achieves such effects that, similarly to the manners as described before in Embodiments 1 and 2, a bypass element for close-circuiting the cell's output terminals is reliably prevented from damage associated with its close-circuit operation when abnormality of the converter cell occurs, and that the continuity of operations is made possible; and also it is advantageous to make a Dower conversion device smaller in size and more inexpensive than that in a case of Embodiments 1 and 2.

Note that, in the present invention, each of the embodiments can be freely combined, and/or each of the embodiments can be appropriately modified or eliminated without departing from the scope of the invention.

EXPLANATION OF NUMERALS AND SYMBOLS

Symbols "EP," "BP1," "BP2," each designate a bypass element; "ES," energy storage element; "P," "N," DC terminal; "Po," "No," cell's output terminal; "U," "V," "W," AC terminal; "10," "10B," "10C," converter cell; "21," "22," "22B," "23," "23B," "24," "31," "32," "33," "34," semiconductor device; "21s," "22s," "23s," "24s," "31s," "32s," "33s," "34s," switching element; "21d," "22d," "23d," "24d," "31d," "32d," "33d," "34d," diode element; "30," fault detection unit; "40," gate drive unit; "301P," "301N," "301," "401," reactor; and "501," "502," "502A," "502B," "503," "601," "602," "602," current sensor.

What is claimed is:

1. A power conversion device, comprising:
 a plurality of converter cells connected in series with one another, each one of the plurality of converter cells including
  two power terminals,
  a bypass element electrically coupled with the two power terminals,
  an electrical energy storage element, and
  semiconductor devices arranged as a plurality of converter arms that is electrically coupled with the electrical energy storage element and configured to perform electrical power conversion between the two power terminals and the electrical energy storage element during a normal operation of the converter cell; and
 circuitry configured to
  detect whether or not each of the converter cells is normal, and
  when abnormality of a particular converter cell is detected, set the bypass element of the particular converter cell to a close-circuit state and control at least one of the plurality of converter arms of the particular converter cell to form an electric current path in parallel with the bypass element for at least a time period until the bypass element of the particular converter cell is in the close-circuit state.

2. The power conversion device as set forth in claim 1, wherein
the particular converter cell of the power conversion device comprises a plurality of bypass elements, and
the circuitry is configured to, when the abnormality of the particular converter cell is detected, set all of the plurality of bypass elements of the particular converter cell to the close-circuit state.

3. The power conversion device as set forth in claim 1, wherein the plurality of converter cells includes a redundant design and is configured to, in a case in which abnormality in one of the plurality of converter cells is detected, maintain a normal operation of the power conversion device when the bypass element of the one of the plurality of converter cells is set to the close-circuit state.

4. The power conversion device as set forth in claim 1, wherein each of the plurality of converter cells includes:
two legs made of two pairs of upper and lower converter arms to constitute four converter arms in total, each one of the four converter arms including a switching element and a diode element connected in antiparallel with the switching element.

5. The power conversion device as set forth in claim 1, wherein each of the plurality of converter cells includes:
two legs made of two pairs of upper and lower converter arms to constitute four converter arms in total, three of the four converter arms each including a switching element and a diode element connected in antiparallel with the switching element, and a remaining one of the four converter arms is made of a diode element.

6. The power conversion device as set forth in claim 1, wherein the circuitry is further configured to perform arm short-circuit protection using at least another one of the plurality of converter arms of the particular converter cell that is not in parallel with the bypass element of the particular converter cell.

7. The power conversion device as set forth in claim 6, wherein the circuitry is further configured to perform the arm short-circuit protection within ten microseconds or fewer after detecting a short-circuit current at the plurality of converter arms of the particular converter cell.

8. The power conversion device as set forth in claim 1, wherein a close-circuit response time for a bypass element from a close-circuit instruction until the bypass element is in the close-circuit state is longer than a turn-on response time for a converter arm from a turn-on instruction until the converter arm is in a turn-on state.

9. The power conversion device as set forth in claim 8, wherein
the close-circuit response time for the bypass element is several tens of microseconds or more, and
the turn-on response time for the converter arm is in an order of several microseconds.

10. The power conversion device as set forth in claim 1, wherein the circuity is configured to
distinguish whether detected abnormality is due to a short-circuit fault in the plurality of converter arms.

11. The power conversion device as set forth in claim 10, wherein the circuitry is configured to, when the detected abnormality corresponds to a short-circuit fault in the plurality of converter arms, set one of the plurality of converter arms connected in parallel with a corresponding bypass element to a turn-on state.

12. A power conversion device, comprising:
a plurality of converter cells connected in series with one another, each one of the plurality of converter cells including
two power terminals,
a bypass element electrically coupled between the two power terminals,
an electrical energy storage element, and
semiconductor devices arranged as a plurality of converter arms that is electrically coupled with the electrical energy storage element and configured to perform electrical power conversion between the two power terminals and the electrical energy storage element during a normal operation of the converter cell; and
circuitry configured to
detect whether or not each of the converter cells is normal,
when abnormality of a particular converter cell is detected, set the bypass element of the particular converter cell to a close-circuit state and set at least one of the plurality of converter arms of the particular converter cell that is in parallel with the bypass element to a turn-on state, and
perform arm short-circuit protection using at least another one of the plurality of converter arms of the particular converter cell.

13. The power conversion device as set forth in claim 12, wherein the circuitry is further configured to perform the arm short-circuit protection within ten microseconds or fewer after detecting a short-circuit current at the plurality of converter arms of the particular converter cell.

14. The power conversion device as set forth in claim 12, wherein
the particular converter cell of the power conversion device comprises a plurality of bypass elements, and
the circuitry is configured to, when the abnormality of the particular converter cell is detected, set all of the plurality of bypass elements of the particular converter cell of to the close-circuit state.

15. The power conversion device as set forth in claim 12, wherein the plurality of converter cells includes a redundant design and is configured to, in a case in which abnormality in one of the plurality of converter cells is detected maintain a normal operation of the power conversion device when the bypass element of the one of the plurality of converter cells is set to the close-circuit state.

16. The power conversion device as set forth in claim 12, wherein a close-circuit response time for a bypass element from a close-circuit instruction until the bypass element is in the close-circuit state is longer than a turn-on response time for a converter arm from a turn-on instruction until the converter arm is in the turn-on state.

17. The power conversion device as set forth in claim 16, wherein
the close-circuit response time for the bypass element is several tens of microseconds or more, and
the turn-on response time for the converter arm is in an order of several microseconds.

* * * * *